US010301983B2

(12) United States Patent
Isoda et al.

(10) Patent No.: US 10,301,983 B2
(45) Date of Patent: May 28, 2019

(54) RELIEF VALVE

(71) Applicant: AISIN SEIKI KABUSHIKI KAISHA, Kariya-shi, Aichi (JP)

(72) Inventors: Atsuo Isoda, Toyoake (JP); Masatoshi Nakamura, Nagoya (JP); Yuichi Kato, Kariya (JP); Takahiro Sakai, Anjo (JP); Kazunari Adachi, Chiryu (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 114 days.

(21) Appl. No.: 15/510,897

(22) PCT Filed: Nov. 11, 2015

(86) PCT No.: PCT/JP2015/081723
§ 371 (c)(1),
(2) Date: Mar. 13, 2017

(87) PCT Pub. No.: WO2016/080261
PCT Pub. Date: May 26, 2016

(65) Prior Publication Data
US 2017/0284242 A1    Oct. 5, 2017

(30) Foreign Application Priority Data

Nov. 19, 2014  (JP) ................. 2014-234796
Nov. 19, 2014  (JP) ................. 2014-234797
(Continued)

(51) Int. Cl.
| | |
|---|---|
| *F01M 1/16* | (2006.01) |
| *F16K 17/06* | (2006.01) |
| *F16K 17/00* | (2006.01) |
| *F16K 31/04* | (2006.01) |
| *F16K 37/00* | (2006.01) |
| *G05D 16/20* | (2006.01) |

(52) U.S. Cl.
CPC .............. *F01M 1/16* (2013.01); *F16K 17/003* (2013.01); *F16K 17/06* (2013.01); *F16K 31/04* (2013.01);
(Continued)

(58) Field of Classification Search
CPC ........ F16K 15/18; F16K 17/06; F16K 17/065; F16K 31/363; F16K 31/002; F01M 1/16; G05D 16/202
(Continued)

(56) References Cited

U.S. PATENT DOCUMENTS 4,657,043 A * 4/1987 Ampferer ................ F01M 1/16
                                                                        137/538
4,860,856 A * 8/1989 Esslinger ................ F01M 1/16
                                                                        184/6.4
(Continued)

FOREIGN PATENT DOCUMENTS

JP          41-8744 B1      5/1966
JP          S60-189678 U    12/1985
(Continued)

OTHER PUBLICATIONS

Machine translation of JPH 1048109.*
(Continued)

*Primary Examiner* — Kevin F Murphy
(74) *Attorney, Agent, or Firm* — Buchanan Ingersoll & Rooney PC

(57) ABSTRACT

A relief valve includes a housing including an internal flow passage through which a working fluid flows, and a relief port discharging the working fluid from the internal flow passage, and a valve body including a first pressure-receiving portion a second pressure-receiving portion receiving pressure with a pressure-receiving area that is larger than a pressure-receiving area of the first pressure-receiving por-
(Continued)

tion, and a first recessed portion formed at the second pressure-receiving portion at an opposite side relative to a pressure-receiving surface of the second pressure-receiving portion and including a closed-end cylindrical shape. The relief valve includes a biasing force adjustment mechanism including a spring of which one end is held at the first recessed portion, a support portion retaining the other end of the spring and including a closed-end cylindrical shape, and a motor adjusting a rotational angle and causing the support portion to reciprocate.

12 Claims, 21 Drawing Sheets

(30) Foreign Application Priority Data

Nov. 19, 2014 (JP) .................................. 2014-234798
Nov. 19, 2014 (JP) .................................. 2014-234799

(52) U.S. Cl.
CPC .......... *F16K 37/005* (2013.01); *G05D 16/202* (2013.01)

(58) Field of Classification Search
USPC ........................................................ 137/494
See application file for complete search history.

(56) References Cited

U.S. PATENT DOCUMENTS

| | | | | |
|---|---|---|---|---|
| 8,454,323 B2* | 6/2013 | Schmidt | .................. | F01M 1/16 417/228 |
| 8,763,634 B2* | 7/2014 | Akaishi | .................. | F01M 1/16 137/512.5 |
| 8,827,659 B2* | 9/2014 | Uno | .................. | F01M 1/16 417/302 |
| 2004/0226613 A1* | 11/2004 | Ono | .................. | F01M 1/16 137/468 |

FOREIGN PATENT DOCUMENTS

| | | |
|---|---|---|
| JP | 10-48109 A | 2/1988 |
| JP | H04-017708 A | 1/1992 |
| JP | 2000-145707 A | 5/2000 |
| JP | 2005-265133 A | 9/2005 |
| JP | 2009-191634 A | 3/2011 |
| JP | 2011-208651 A | 10/2011 |
| JP | 2014-98326 A | 5/2014 |
| JP | 2014-159758 A | 9/2014 |

OTHER PUBLICATIONS

Office Action (Notification of Reasons for Refusal) dated Mar. 6, 2018, by the Japanese Patent Office in corresponding Japanese Patent Application No. 2014-234798 and an English Translation of the Office Action. (7 pages).

English language translation of International Preliminary Report on Patentability (Forms PCT/IB/338, PCT/IB/373 and PCT/ISA/237), with Written Opinion, dated Jun. 1, 2017, by the International Bureau of WIPO in corresponding International Application No. PCT/JP2015/081723. (9 pages).

International Search Report (PCT/ISA/210) dated Feb. 16, 2016, by the Japanese Patent Office as the International Searching Authority for International Application No. PCT/JP2015/081723.

Written Opinion (PCT/ISA/237) dated Feb. 16, 2016, by the Japanese Patent Office as the International Searching Authority for International Application No. PCT/JP2015/081723.

* cited by examiner

F I G. 12
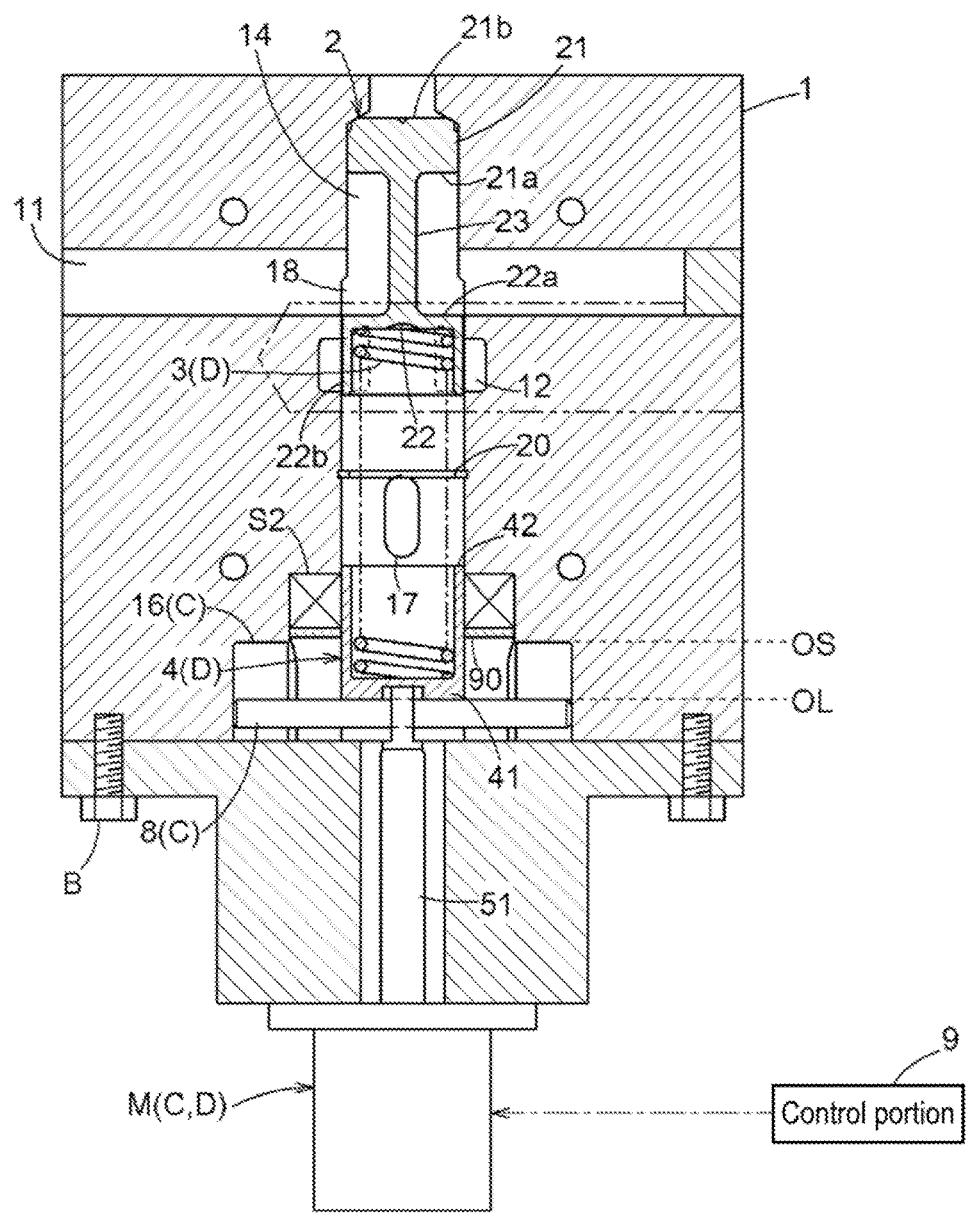

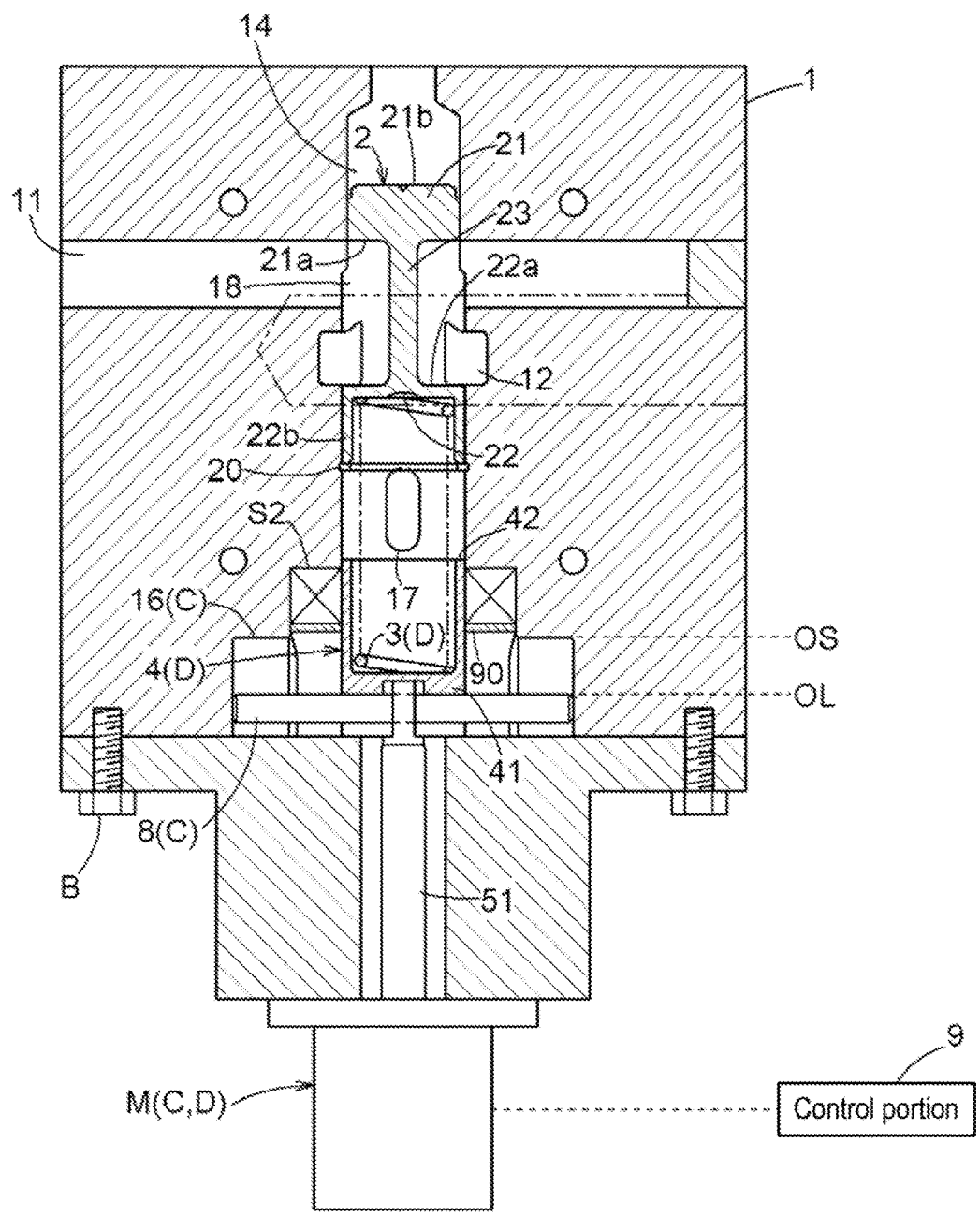
F I G. 14

F I G. 22
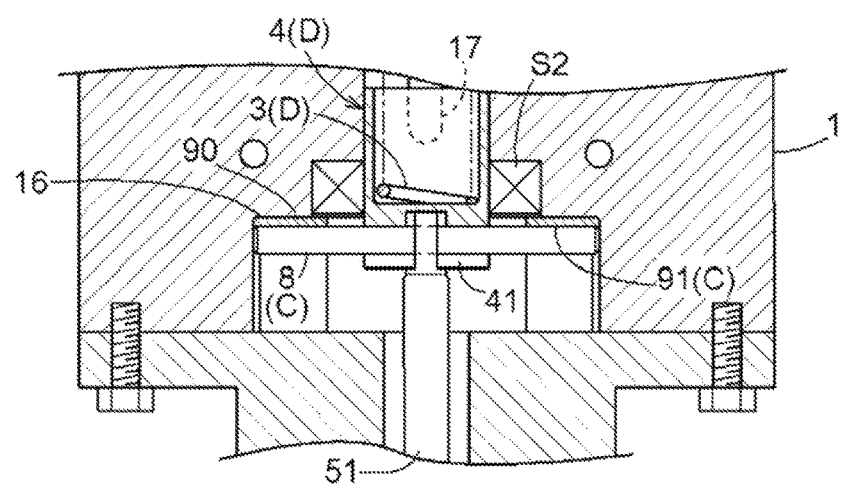

RELIEF VALVE

TECHNICAL FIELD

This invention relates to a relief valve adjusting pressure of a working fluid, more specifically, this invention relates to the relief valve adjusting a discharge pressure of a pump.

BACKGROUND ART

Conventionally, a relief valve is known which is arranged between an engine and an oil pump circulating a working fluid to lubricated members a the engine, and adjusts a discharge pressure of the oil pump (for example, refer to Patent documents 1 and 2). The relief valve includes a housing provided with an internal flow passage in which the working fluid flows and a relief port discharging the working fluid from the internal flow passage, and a valve body reciprocating inside the housing. A pressure of the working fluid acts on an upper surface of the valve body and a biasing force of a spring acts on the valve body in a direction opposing the pressure. In a case where the pressure exceeds the biasing force of the spring, the relief port is opened and the working fluid is discharged to an upstream-side relative to the oil pump, thereby reducing the discharge pressure of the oil pump.

A relief valve of Patent document 1 includes a support portion which is capable of reciprocating while supporting an end portion, at a side opposite to a valve body, of a spring. The relief valve supplies a working fluid, which is discharged from an oil pump, to a back surface of the support portion via a three-way valve. During a normal operation of an engine, the three-way valve is controlled to supply the working fluid to the back surface of the support portion, and thus the spring is compressed, thereby increasing a relief pressure. On the other hand, during a worm-up of the engine, the three-way valve is controlled to discharge the working fluid existing at the back surface of the support portion, and thus the spring is expanded, thereby reducing the relief pressure. It is described that the pressure of the working fluid flowing to the engine is thereby reduced and the worm-up is facilitated.

Patent document 2 discloses a technique that a switch valve is provided between, an oil pump and a relief valve and that the switch valve is operated to open to increase a pressure-receiving area of a valve body, thereby assisting relief valve to open. That is, it is configured such that, by increasing and decreasing the pressure-receiving area of the valve body in a state where a biasing force of a spring is maintained constant, a high-pressure relief mode and a low-pressure relief mode can be selected. In addition, when operating the switch valve to open and close, an electromagnetic valve provided between the oil pump and the switch valve is controlled to turn ON/OFF, thereby supplying/discharging a working fluid, relative to a spool of the switch valve.

DOCUMENT OF PRIOR ART

Patent Document

Patent document 1: JP2009-191634A
Patent document 2: JP2014-98326A

OVERVIEW OF INVENTION

Problem to be Solved by Invention

At an oil pump used for lubricating and/or cooling an engine, by setting a relief pressure to a medium pressure mode that is between a normal mode and a low-pressure mode, an operation efficiency of the pump may be increased so that fuel efficiency is enhanced. However, at the known relief valve, the relief pressure of the valve body is limited to a two-stage setting, and thus there remains room for improvement.

In addition, the known relief valve cannot be opened without introduction of a relatively large pressure because the pressure of the working fluid is made to act on the upper surface of the valve body, and thus responsiveness is poor in a case where the valve needs to be opened quickly. Further, the relief valve of Patent document 1 is configured such that the support portion is reciprocated by the working fluid, and thus it takes time until a desired relief pressure is reached. In addition, according to the relief valve of the Patent document 2, the switch valve is operated to open and close via the electromagnetic valve, and accordingly a time lag easily occurs before the working fluid is introduced to the relief valve, and also the Configuration is complicated.

It is desired therefore that a relief valve which includes an excellent responsiveness and at which various relief pressures can be set is configured reasonably.

Means for Solving Problem

A characteristic configuration of a relief valve is that the relief valve includes a housing including an internal flow passage through which a working fluid flows, and a relief port discharging the working fluid from the internal flow passage, a valve body including a first pressure-receiving portion receiving pressure of the working fluid flowing in the internal flow passage, a second pressure-receiving portion connected, to the first pressure-receiving portion to oppose the first pressure-receiving portion and receiving the pressure with a pressure-receiving area that is larger than a pressure-receiving area of the first pressure-receiving portion, and a first recessed portion formed at the second pressure-receiving portion to be at an opposite side relative to a pressure-receiving surface of the second pressure-receiving portion and including a closed-end cylindrical shape, the valve body being capable of reciprocating inside the housing, and a biasing force adjustment mechanism including a spring or which one end is held at the first recessed portion and biasing in a direction opposing the pressure, a support portion formed with a second recessed portion retaining the other end of the spring and including a closed-end cylindrical shape, and a motor adjusting a rotational angle and causing the support portion to reciprocate.

According to the configuration, the valve is opened by using a difference between the areas of the first pressure-receiving portion and the second pressure-receiving portion. Accordingly, the valve is opened by a relatively small pressure from the working fluid, and thus responsiveness is enhanced. The pressure applied to the valve body works, via the spring, in a direction in which the support portion is made to retract or withdraw. The pressure is small, and thus the drive force of the motor which reciprocates the support portion may be made small, thereby downsizing the motor.

On the other hand, according to the configuration, the support portion is caused by the motor to reciprocate and the biasing force of the spring is adjusted. Accordingly, for example, in a case where the valve is intended to be opened with a pressure that is large to some extent, the spring is made to compress and the biasing force is set to be large, thereby increasing a relief pressure. That is, by adjusting the rotational angle of the motor, a position of the support portion is arbitrarily set and a set length of the spring is changed in a multistep manner. Accordingly, various relief pressures can be set in accordance with the biasing force of the spring. Consequently, in a case where the relief valve including the present configuration is used for adjusting a discharge pressure of an oil pump of an engine, plural pressure modes of the relief pressure can be set in addition to a high-voltage mode and/or a low-voltage mode. Thus, a relief pressure at which operation efficiency is the highest can be selected in accordance with, for example, the number of rotations of the engine.

Further, according to the configuration, the set length of the spring is changed by the motor, and thus there is no need to change the flow passage with the use of an electromagnetic valve and/or a three-way valve like a known case. Consequently, responsiveness can be enhanced with a simple configuration.

Another characteristic configuration is that a through hole portion is formed at a side wall of the first recessed portion, the through hole portion is in communication with the relief port in a movable region of the first recessed portion.

In a case where the spring is arranged between, the valve body and the support portion and the support portion is moved relative to the valve body, air existing in an accommodation space of the spring and/or the working fluid entering from a gap between the valve body and the housing serve as back-pressure resistance and inhibit the valve body and/or the support portion from reciprocating.

In a case where the through hole portion, which is in communication with the relief port in the movable region of the first recessed portion, is formed at the side wall of the first recessed portion of the second pressure-receiving portion as in the present configuration, the back pressure in the accommodation space of the spring is released to an outside and smooth reciprocating movements of the valve body and the support portion are realized. Further, the relief port also includes a function of a back-pressure-escape hole, and accordingly there is no need to separately form a back-pressure-escape hole at the housing, which enhances reasonability.

Another characteristic configuration is that a back-pressure hole portion which is in communication with an accommodation space of the spring is formed at a side wall of the housing in a penetrating manner, and the back-pressure hole portion is in communication with the accommodation space when the first recessed portion and the second recessed portion are the closest to each other.

In a case where the back-pressure hole portion is in communication with the accommodation space of the spring as in the present configuration, the air and/or the working fluid are discharged to the outside and smooth reciprocating movements of the valve body and the support portion are realized. Further, the configuration is a simple and reasonable configuration in which the back-pressure hole portion is provided at the wide wall of the housing.

On the other hand, as described above, the valve body reciprocates upon receiving the pressure of the working fluid and the support portion is reciprocated by the motor. Accordingly, a position of the first recessed portion of the valve body and/or a position of the second recessed portion of the support portion are changed frequently, and thus the back-pressure hole portion may be blocked. However, in a case where the back-pressure hole portion is in communication with the accommodation space of the spring when the first recessed portion and the second recessed portion come closest to each other, the valve body and/or the support portion always move in a state where the back-pressure resistance is reduced. As a result, the responsiveness of the relief valve is even more enhanced.

Another characteristic configuration is that a through hole portion is formed at a side wall of the second recessed portion, and a back-pressure hole portion which is in communication with the through hole portion of the second recessed portion in a movable region of the second recessed portion is formed at the side wall of the housing, in a penetrating manner.

Generally, the support portion is arranged at a lower side relative to the valve body. In a case where the through hole portion of the support portion and the back pressure hole portion of the housing are in communication with each other in the movable region of the second recessed portion as in the present configuration, the working fluid that has leaked out from a gap between the housing and the valve body falls down due to the gravity force and then is discharged from the back-pressure hole portion promptly.

Another characteristic configuration is that the relief valve includes a movement prevent on portion provided between the valve body and the support portion and restricting the valve body from moving towards the support portion.

As described above, in the movable region of the valve body and/or the support portion, the accommodation space of the spring is in communication with the relief port or the back-pressure hole portion which is formed at the housing. On the other hand, in a case where a pressure that is equal to or greater than an allowable pressure is applied to die valve body, the through hole portion of the first recessed portion may out of communication with the relief port and/or the first recessed portion may block the back-pressure hole portion. By providing the movement prevention portion which prevents the valve body from moving beyond the movable region as in the present configuration, the state in which the accommodation space of the spring is in communication with the relief port or the back-pressure hole portion is maintained. Consequently the working fluid and/or the air existing in the accommodation space of the spring are reliably discharged.

Another characteristic configuration is that the motor corresponds to a stepping motor.

By using the stepping motor for the movement control of the support portion as in the present configuration, a step angle corresponding to the number of pulses can be set finely, and accordingly the position of the support portion can be set accurately. Consequently, various relief pressures can be set easily.

Another characteristic configuration is that the relief valve includes a reference position setting mechanism causing the support portion to be in contact with a predetermined portion of the housing to cause the stepping motor to lose synchronism and setting a reference position of the stepping motor at an operation of the stepping motor.

Even when the stepping motor is applied with a desired voltage and is driven, if the pressure acting on the valve body becomes larger than a holding torque of the motor, a phenomenon of loss of synchronism may occur to the stepping motor in which the rotation of the motor is inhibited. In a case where the phenomenon of loss of synchronism occurs, the desired relief pressure cannot be set even though the motor is rotated by a predetermined amount because a current position of the support portion cannot be grasped.

According to the present configuration, at the operation of the motor, the support portion is made to be in contact with the predetermined portion of the housing to cause the loss of synchronism of the motor, and the reference position of the motor at the reciprocation of the support portion is set. For example, it can be considered that the motor is operated at the step angle corresponding to the largest movement distance of the support portion to move the support portion to an upper limit position, or a hold voltage of the motor is reduced to move the support portion to a lower limit position. In either of the above cases, the reference position of the motor in reciprocating the support portion is set, and accordingly a mechanical movement-position of the support portion and an electrical movement-position recognized by the motor agree to each other the when the motor is operated the next time. As a result, the biasing force of the spring can be adjusted accurately.

Another characteristic configuration is that the relief valve includes a pressure sensor measuring pressure of the working fluid, and a control portion adjusting a drive force of the motor, wherein the control portion determines a movement distance of the support portion and a response time of the motor on the basis of a target pressure and a measured pressure measured at the pressure sensor.

According to the configuration, the movement distance of the support portion and the response time are determined on the basis of the target pressure and the measured pressure. As a result, the control for bringing the actual pressure to the target pressure can be performed accurately and quickly, thereby enhancing the operation efficiency of the pump. In addition, for example, in a case where the number of rotations of the engine increases rapidly, it can be controlled such that the biasing force of the spring is changed promptly and a large amount of the working fluid is supplied to the engine. Consequently, the engine can be maintained in a good state.

Another characteristic configuration is that the relief valve includes a temperature sensor measuring temperature of the working fluid, and a control portion adjusting a drive force of the motor, wherein in a case where a measured temperature measured at the temperature sensor is equal to or smaller than a first temperature, the control portion sets a high-voltage mode in which a first voltage is applied to the motor and in a case where the measured temperature exceeds the first temperature, the control portion sets a low-voltage mode in which a second voltage which is smaller than the first voltage is applied to the motor.

Because the pressure working on the valve body changes depending, on viscosity of the working fluid, a drive force of the motor, which is required to reciprocate the support portion against the pressure, changes. According to the present configuration, the voltage applied to the motor for the actuation is set at the high-voltage mode because the pressure working on the valve body is high in a case where the working fluid is at a low temperature and the viscosity is high. On the other hand, in a case where the working fluid is at a high temperature and the viscosity is low, the voltage applied to the motor for the actuation is set at the low-voltage mode because the pressure working on the valve body is low. The applied voltage to the motor is thereby optimized and electricity consumption can be saved. Furthermore, by setting the low-voltage mode, an amount of self-generated heat of the motor decreases and accordingly durability of the motor increases. To the contrary, in a case where the working fluid is at a low temperature, an ambient temperature around the motor is low, and therefore durability of the motor is not easily deteriorated even if the applied voltage to the motor is set to the high voltage mode continuously.

BRIEF DESCRIPTION OF DRAWINGS

FIG. 12 is a cross-sectional view taken along line XII-XII of FIG. 11.

FIG. 14 is a cross-sectional view illustrating a fully-opened state of the relief valve at a lowest pressure setting.

FIG. 22 is a cross-sectional view of a come-off prevention member, which shows a third alternative embodiment.

MODE FOR CARRYING OUT THE INVENTION

Embodiments of a relief valve related to the present invention will be described on the basis of the drawings. In the embodiments, as an example, explanation is made on a relief valve X adjusting a discharge pressure of an oil pump 6 (which will be hereinafter simply referred to as a pump 6) circulating an engine oil (which is an example of working fluid and will be hereinafter simply referred to as working oil) to an engine E. However, without being limited to the embodiments described below, various changes or modifications may be made without departing from the scope thereof.

Overall Configuration of a First Embodiment

Figure 1:
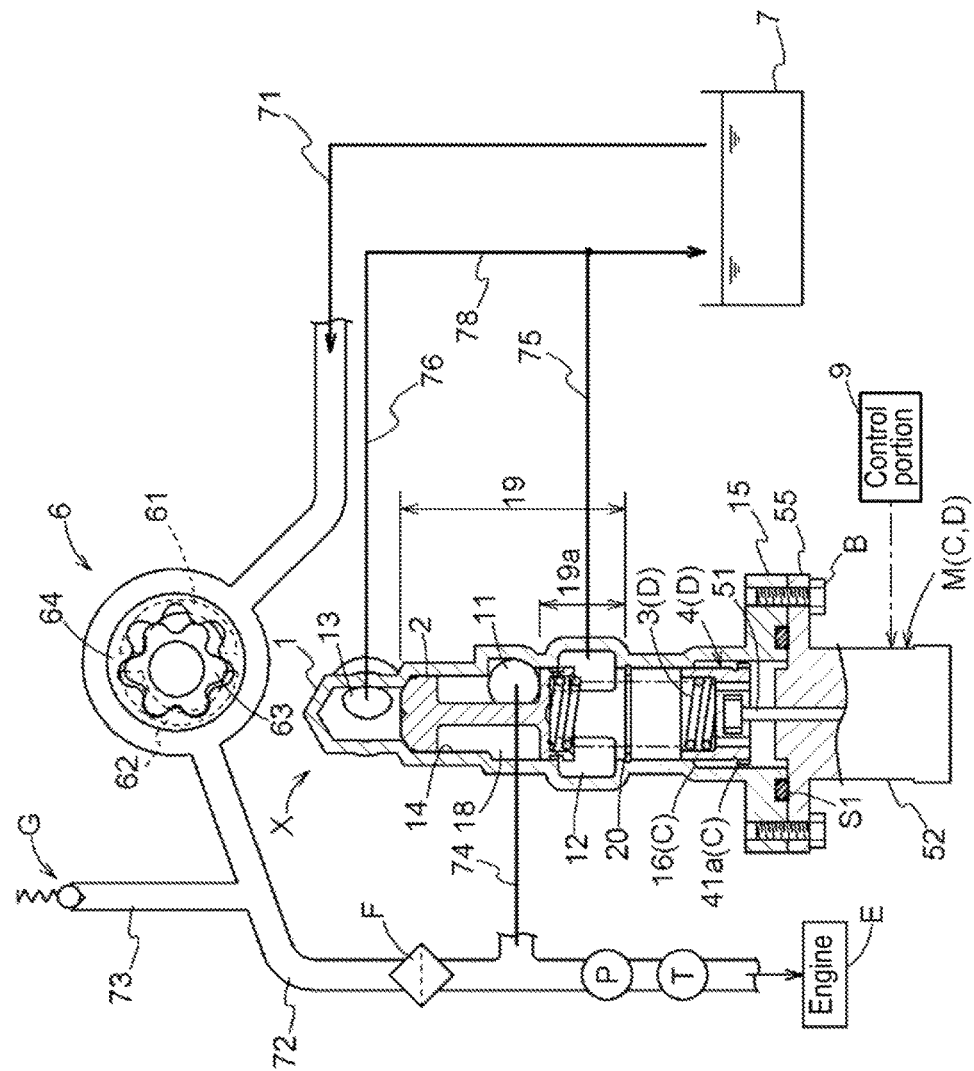
FIG. 1 is a diagram illustrating a configuration of flow passages related to a first embodiment.

As illustrated in FIG. 1, the pump 6 is arranged between an oil pan 7 storing the working oil and the engine E and the pump 6 circulates the working oil to lubricated members of the engine E including a piston, a cylinder, a bearing of a cranks shaft, for example.

The working oil stored in the oil pan 7 is pumped up by the operation of die pump 6 and flows into an inlet port 61 of the pump 6 via an inlet flow passage 71. The working oil that has flowed from the inlet port 61 into the pump 6 is discharged from a discharge port 62 at the discharge pressure corresponding to an eccentric amount of a rotational center of an inner rotor 63 and a rotational center of an outer rotor 64.

The working oil that has been discharged from the pump is filtered by an oil filter F of a first flow passage 72, and thereafter is supplied to the engine E. The relief valve X of the embodiment is arranged between the pump 6 and the engine E, and is connected to a second flow passage 74 branched off from the first flow passage 72. In the embodiment, the second flow passage 74 is branched off at a downstream-side of the oil filter F. Thus, a frequency at which a foreign material included in the working oil flows in the relief valve X is reduced. On the other hand, a check valve G is arranged between the pump 6 and the oil filter F, on a third flow passage 73 branched off from the first flow passage 72. The check valve G opens in a case where the discharge pressure from the pump 6 increases rapidly due to, for example, clogging of the oil filter F. The arrangement of the relief valve X may be between the pump 6 and the oil filter F, and is not specifically limited. In addition, the check valve G may be configured by a relief valve, and is not specifically limited.

The working oil that has been introduced to the relief valve X via the second flow passage 74 flows through an internal flow passage 18 of the relief valve X. In a case where the relief valve X is in an opened state, the working oil flowing in the internal flow passage 18 is discharged to a fourth flow passage 75 and then is returned to the oil pan 7 via a drain passage 78. As a result, the working oil flows to the engine E in a state where the discharge pressure from the pump 6 is reduced. On the other hand, in a case where the relief valve X is in a closed state, the discharge pressure from the pump 6 is not reduced and the working oil circulates, or flows to the engine E. That is, the relief valve X includes a function of adjusting pressure of the working oil discharged from the pump 6. In addition, a fifth flow passage 76 is connected to an upper side of the relief valve X, and also the fifth flow passage 76 is in communication with the drain passage 78. The working oil leaking out from a gap between a housing 1 of the relief valve X and a valve body 2 of the relief valve X is drained via the fifth flow passage 76.

The forth flow passage 75 and/or the fifth flow passage 76 may be in communication, directly with the oil pan 7 without joining the drain passage 78, or may be in communication with the in let flow passage 71 arranged between the pump 6 and the oil pan 7.

A temperature sensor T and a pressure sensor P are provided at the first flow passage 72 at the downstream side relative to the pump 6. A measured pressure Pd of the pressure sensor P and/or a measured temperature Td of the temperature sensor T are inputted into a control portion 9 adjusting a drive force of a motor M, which will be described in detail later. Further, for example, an actual number of rotations of the engine E which is measured from a rotation sensor provided a crankshaft and/or information of load on the engine E which is measured from, for example, an opening degree of a throttle, are inputted into the control portion 9, which, is not shown in the drawings.

[Relief Valve]

Figure 2:
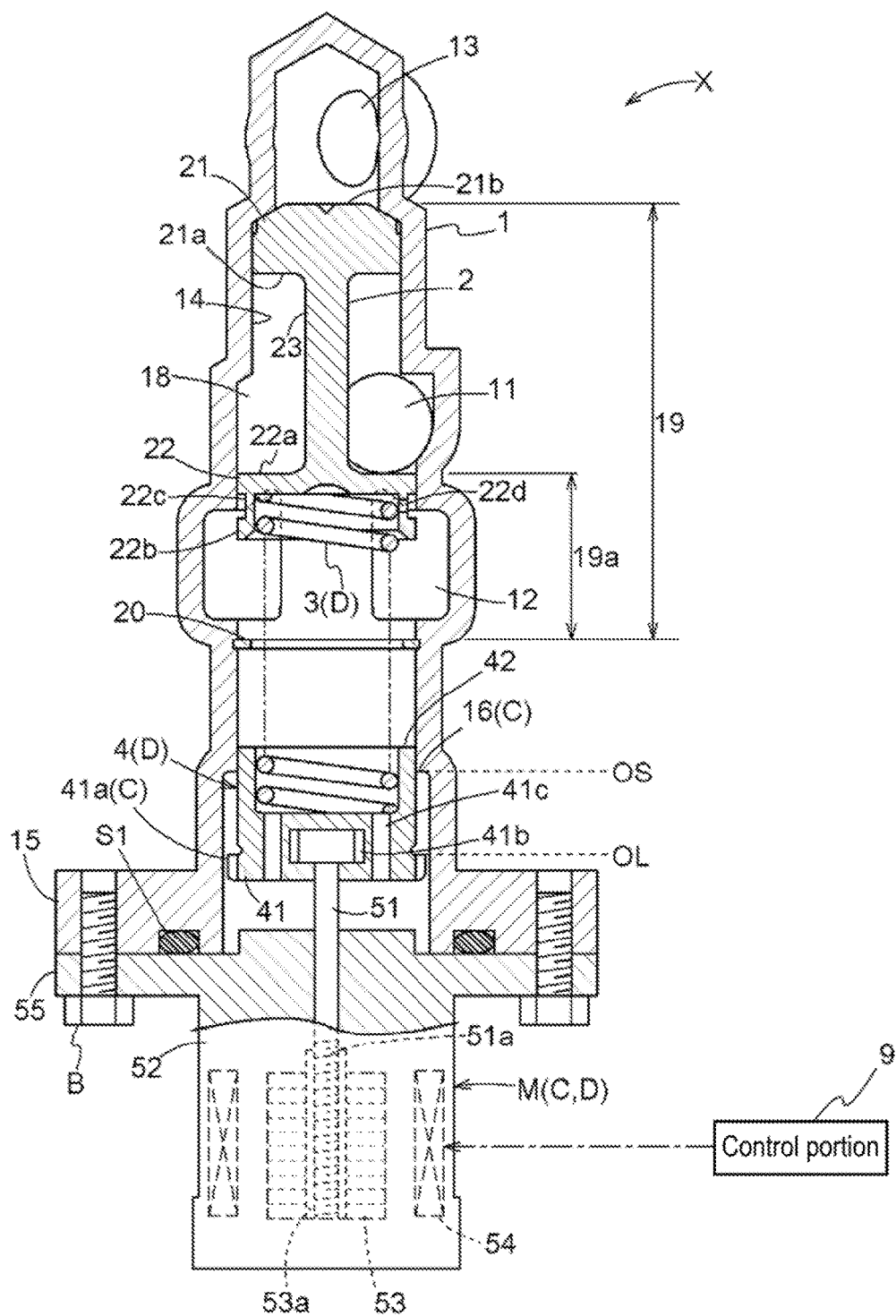
FIG. 2 is a cross-sectional view illustrating a closed state of a relief valve at a lowest pressure setting.

As illustrated in FIG. 2, the relief valve X includes the housing 1, the valve body 2, a spring 3, a retainer 4 (an example of a support portion) and the motor M. In the following explanation, a side towards the valve body 2 will be referred to as an upper side and a side towards the motor M will be referred to as a lower side.

The housing 1 includes an introduction port 11 introducing the working oil discharged from the pump 6, and a relief port 12 discharging the introduced oil. The introduction port 11 and the relief port 12 are formed at a side wall of the housing 1. In addition, a drain port 13 which serves as a breathing hole when the valve body 2 is moving and discharges the leaked working oil is formed at an upper side of the housing 1.

An internal hole portion 14 formed in a cylindrical shape and accommodating the valve body 2, the spring 3 and the retainer 4 is formed at an inner circumferential surface of the housing 1. In addition, the housing 1 includes the internal flow passage 18 in a space portion surrounded by the internal hole portion 14, between the introduction port 11 and the relief port 12. The working oil discharged from the pump 6 flows in the internal flow passage 18. As illustrated FIG. 3, each of the introduction port 11 and the relief port 12 includes a rectangular cross section, and a cross-sectional area of the relief port 12 is configured to be larger than a cross-sectional area of the introduction port 11. In addition, as illustrated in FIG. 2, a length of the relief port 12 in a radial direction is configured to be larger than a length of the internal hole portion 14 in a radial direction. The cross section of the introduction port 11 and/or the relief port 12 may include other shape, for example, a circular, instead of the rectangular.

The valve body 2 is accommodated inside the housing 1 and reciprocates upon receiving the pressure of the working oil flowing in the internal flow passage 18. The reciprocating movement of the valve body 2 is guided by the internal hole portion 14 while the valve body 2 is in sliding-contact with the internal hole portion 14. The valve body 2 is capable of reciprocating at least in a movable region 19 which is from a position illustrated in FIG. 2 and to a position illustrated in FIG. 4.

The valve body 2 includes a first pressure-receiving portion 21 and a second pressure-receiving portion 22 which receive the pressure of the working oil flowing in the internal flow passage 18. The second pressure-receiving portion 22 is arranged at a side of the spring 3 so as to oppose the first pressure-receiving portion 21, and is connected to the first pressure-receiving portion 21 with a connecting member 23.

Figure 3:
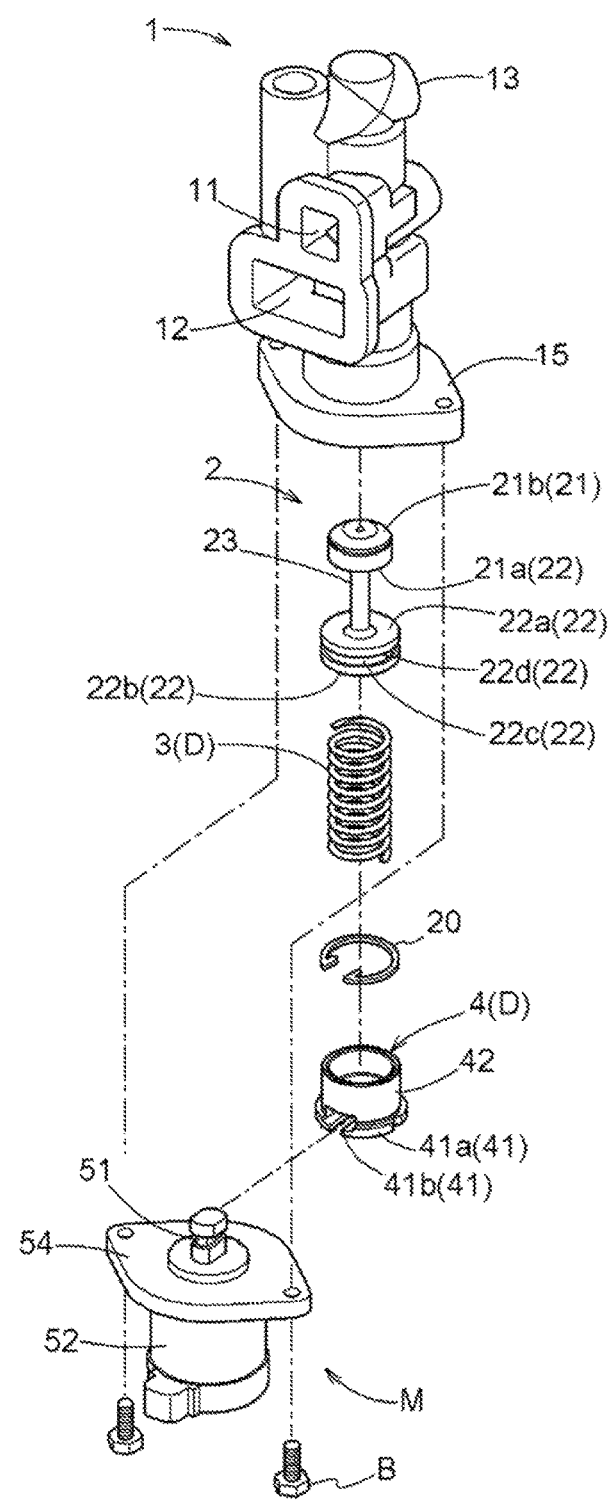
FIG. 3 is an exploded perspective view of the relief valve.

The first pressure-receiving portion 21 is formed with a first pressure-receiving surface 21a receiving the pressure of the working oil flowing in the internal flow passage 18 and an upper surface portion 21b including a frustoconical configuration and formed at a side opposite to the first pressure-receiving surface 21a. The second pressure-receiving portion 22 is formed with a second pressure-receiving surface 22a receiving the pressure of the working oil flowing in the internal flow passage 18 with a pressure-receiving area which is larger than a pressure-receiving area of the first pressure-receiving surface 21a, and a first recessed portion 22b including a closed-end cylindrical shape and formed at an opposite side relative to the second pressure-receiving surface 22a. As illustrated in FIG. 3, an annular groove 22c is formed at an outer circumferential surface of the second pressure-receiving portion 22, and plural through hole portions 22d that are in communication with the relief port 12 are formed at the annular groove 22c. Without being limited specifically to the above, the single through hole portion 22d may be formed and the annular groove 22c does not need to be formed.

Figure 4:
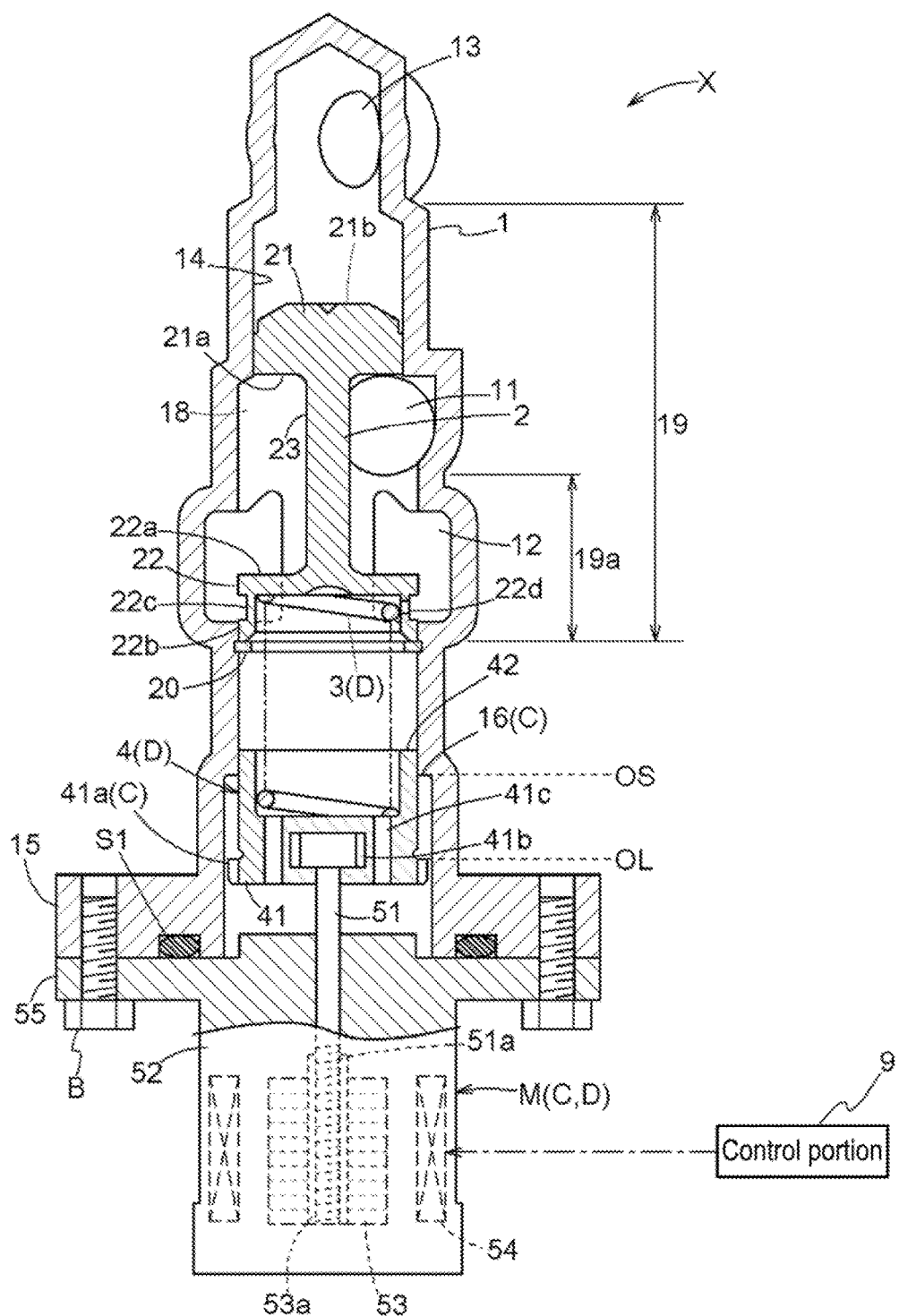
FIG. 4 is a cross-sectional view illustrating a fully-opened state of the relief valve at the lowest pressure setting.

The valve body 2 moves in the reciprocating manner in the movable region 19 that is from a non-dischargeable position in which the second pressure-receiving portion 22 blocks the relief port 12 (refer to FIG. 2) to a fully-open discharge position in which a lower end portion of the first recessed portion 22b of the second pressure-receiving portion 22 is in contact with a lower end portion of the relief port 12 (refer to FIG. 4). That is, the through hole portion 22d of the first recessed portion 22b is configured to be in communication with the relief port 12 in a movable region 19a of the first recessed portion 22b (specifically in a case where the valve body 2 moves to the position shown in FIG. 4), and the through hole portion 22d serves as a breathing hole when the valve body 2 moves in the reciprocating manner.

The spring 3 biases the valve body 2 in a direction opposing the pressure of the working oil working on the valve body 2 (towards the introduction port 11). One end of the spring 3 is supported by the first recessed portion 22b of the valve body 2 and the other end of the spring 3 is supported by a second recessed portion 42 of the retainer 4, which will be described later.

Figure 5:
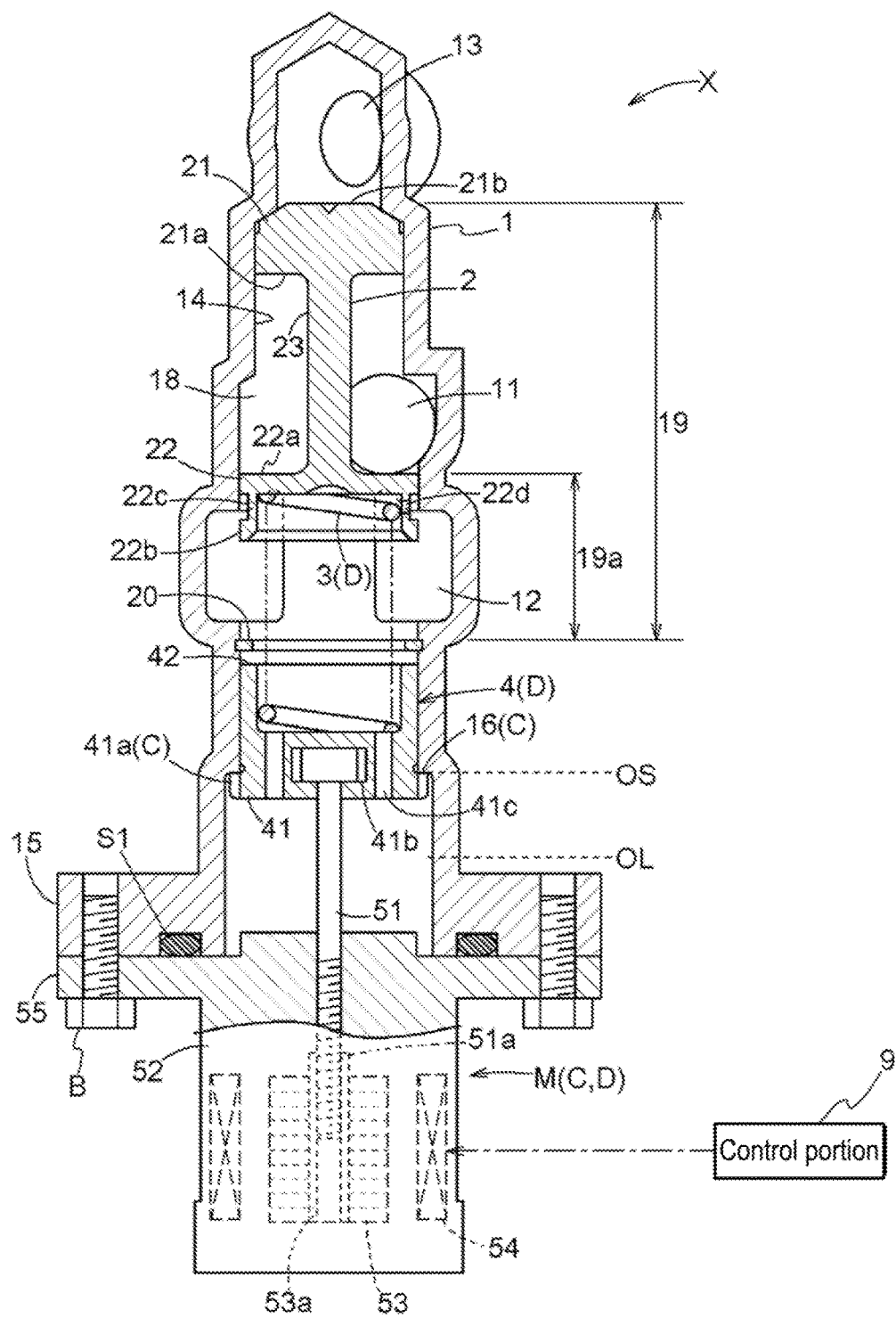
FIG. 5 is a cross-sectional view illustrating the closed state of the relief valve at a highest pressure setting.

The retainer 4 includes a closed-end cylindrical shape and reciprocates inside the housing 1. The reciprocating movement of the retainer 4 is guided while the retainer 4 is being in sliding-contact with the internal hole portion 14. As illustrated in FIG. 3, the retainer 4 includes the second recessed portion 42 and a protruding portion 41a. The second recessed portion 42 includes a closed-end cylindrical shape and retains the other end of the spring 3 (the end at a side opposite to the valve body 2). The protruding portion 41a is formed in a manner that an end portion 41 at a side opposite to the second recessed portion 42 (the side at which the motor M is) is made to protrude annularly in a radial outward direction. As illustrated in FIG. 5, the protruding portion 41a is in contact with a step portion 16 formed at the internal bole portion 14 of the housing 1, and thus an upper limit position OS of the retainer 4 is determined.

As illustrated in FIG. 3, a slide hole portion 41b is formed at the center of an end portion 41 of the retainer 4 in a cut-out manner. A shaft 51 of the motor M is slid and inserted in the slide hole portion 41b. In addition, as illustrated in FIG. 2, a hole portion 41c is formed to penetrate a lateral side of the slide hole portion 41b so that an accommodation space of the spring 3 is communication with a space portion between the retainer 4 and the motor M.

The motor M of the embodiment is configured by a stepping motor adjusting a rotational angle and causing the retainer 4 to reciprocate. As the stepping motor is publicly known, detailed explanation will be omitted.

The motor M includes a case 52, and a stator coil 54 and a rotor 53 are accommodated inside the case 52. The stator coil 54 is electrified upon receiving a signal from the control portion 9 as will be described later. The rotor 53 rotates upon receiving magnetic flux from the stator coil 54. In addition, the motor M includes the shaft 51 connected to the retainer 4, and a male thread portion 51a threadedly engaging with a female thread portion 53a of the rotor 53 is formed at an outer circumferential surface of the shaft 51.

As the rotor 53 rotates, the male thread portion 51a threadedly engaged with the female thread portion 53a formed on an internal surface of the rotor 53 moves linearly. That is, a linear motion conversion mechanism converting a rotational motion of the motor M into a linear motion is configured by the female thread portion 53a of the rotor 53 and the male thread portion 51a of the shaft 51. Any other manner is applicable, for example, the linear motion conversion mechanism may be configured by using a worm gear and/or the female thread portion threadedly engaging with the male thread portion 51a of the shaft 51 may be provided at the retainer 4.

An assembly procedure of the relief valve X of the embodiment will be described. As illustrated in FIG. 3, the shaft 51 of the motor M is inserted into the slide hole portion 41b of the retainer 4 from a radial direction. Thereafter, the valve body 2, a snap ring 20 which will be described below, the spring 3, the retainer 4 and the motor M are inserted in the housing in a sequential order. Thereafter, in a state where a flange portion 55 formed at the case 52 of the motor M is overlapped on a flange portion 15 formed at the housing 1, they are fastened with a bolt B. At this time, as illustrated in FIG. 2, a seal member S1 including an annular shape is attached between the flange portion 55 of the case 52 and the flange portion 15 of the housing 1. The seal member S1 prevents the working oil existing inside the housing 1 from leaking to an outside.

[Biasing Force Adjustment Mechanism]

FIG. 2 illustrates a state in which the retainer 4 is at a lower limit position OL and FIG. 5 illustrates a state in which the retainer 4 is at the upper limit position OS. As described above, the retainer is reciprocated by the motor M. As a result, a set length or set height of the spring 3 is changed between a state illustrated in FIG. 2 in which the spring 3 is most expanded and stretched, and a state illustrated in FIG. 5 in which the spring 3 is most compressed and shortened. Thus, a biasing force adjustment mechanism D is configured, which changes the set length of the spring 3 as the retainer 4 reciprocates upon receiving the drive force of the motor M. That is, the biasing force adjustment mechanism D configured by the spring 3, the retainer 4 and the motor M.

In the state shown in FIG. 2, a relief pressure of the relief valve X is at a lowest pressure setting because a biasing force of the spring 3 is the smallest. On the other hand, in the state show in FIG. 5, the relief pressure of the relief valve X is at a highest pressure setting because the biasing force of the spring 3 is the largest.

As described above, the motor M of the embodiment is the stepping motor, and thus a position of the retainer 4 can be set finely by finely adjusting a step angle As corresponding to a pulse number. As applied to the motor M. For example, in a case where the step angle As of one pulse is 15 degrees, the motor M makes one rotation at 24 pulses. In a case where a movement distance L of the retainer 4 is 1 mm per rotation, the retainer 4 is made to move for 10 mm by rotating the motor 10 times. That is, the set length of the spring 3 can be changed in a multistep manner (for example, 240 ways) in response to the pulse number Pn. Further, the position of the retainer 4 is configured to be set with the use of the motor M, the biasing force of the spring 3 can be adjusted accurately without being influenced by, for example, viscosity and/or pulsation of the working oil.

When the working oil flows in the internal flow passage 18 of the housing 1 in a state where the biasing force of the spring 3 is adjusted, the pressure of the working oil is applied according to a difference of the areas of the respective pressure-receiving surfaces 21a and 22a. In a case where the pressure exceeds the biasing force of the spring 3, the valve body 2 starts lowering, the relief port 12 opens and the working oil is drained to the oil pan 7. In a case where the valve body 2 further lowers, an amount of the working oil which corresponds to an opening area of the relief port 12 is drained to the oil pan 7. That is, it is configured such that the pressure of the working oil flowing to the engine E is released when the discharge pressure of the pump 6 exceeds a predetermined threshold value.

Figure 6:
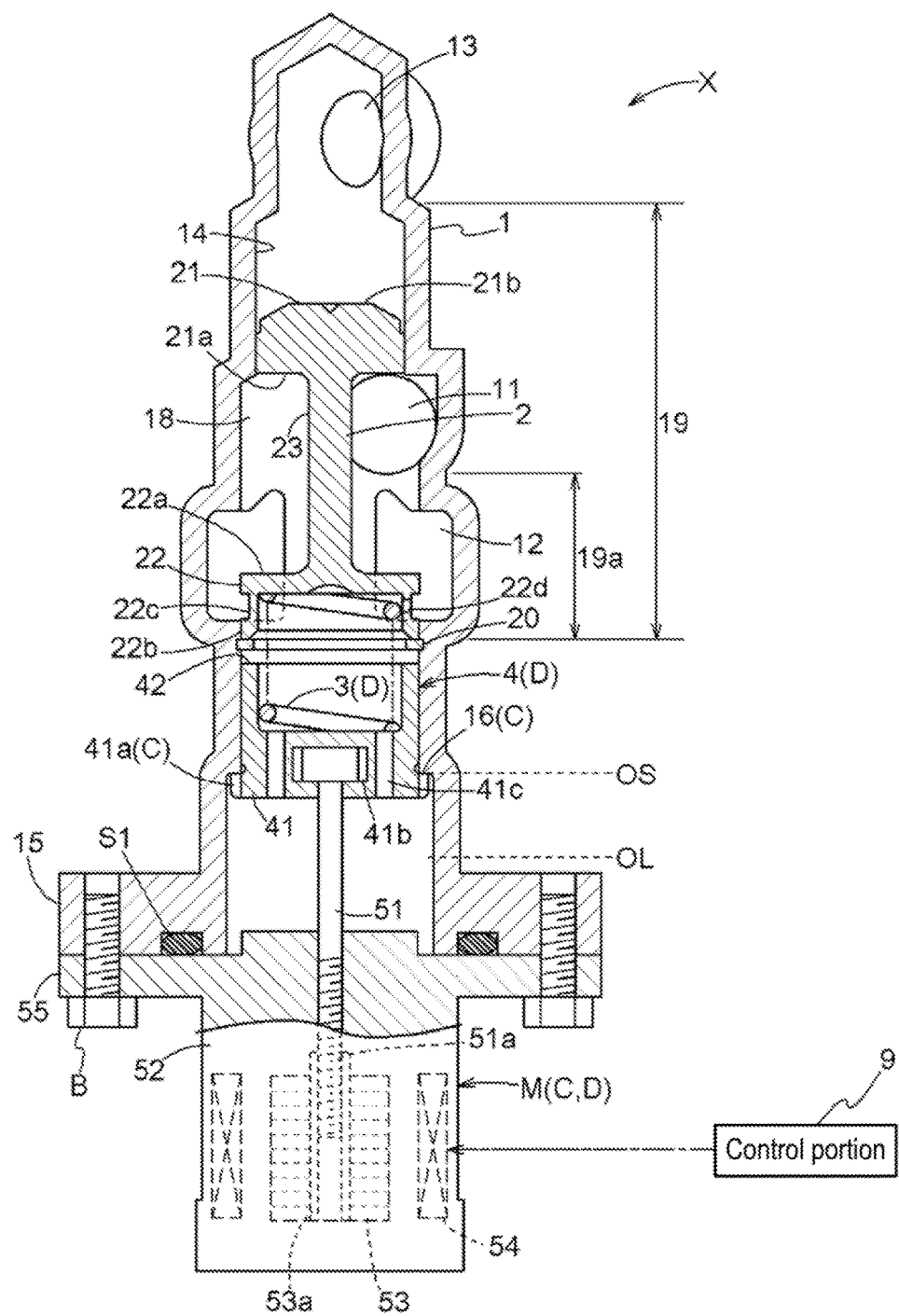
FIG. 6 is a cross-sectional view illustrating the fully-opened state of the relief valve at the highest pressure setting.

In a case where the relief pressure is at the lowest pressure setting as illustrated in FIG. 2, the valve body 2 starts lowering when the pressure corresponding the difference of the areas of the respective pressure-receiving surfaces 21a and 22a increases to a first pressure, and the relief port 12 comes to be in a fully-opened state as illustrated in FIG. 4 when the pressure corresponding the difference of the areas of the respective pressure-receiving surfaces 21a and 22a reaches a second pressure. On the other hand, in a case where the relief pressure is at the highest pressure setting as illustrated in FIG. 5, the valve body 2 starts lowering when the pressure corresponding the difference of the areas of the respective pressure-receiving surfaces 21a and 22a is at a third pressure which is larger than the first pressure and the relief port 12 comes to be in the fully-opened state as illustrated in FIG. 6 when the pressure corresponding the difference of the areas of the respective pressure-receiving surfaces 21a and 22a reaches a fourth pressure which is larger than the second pressure.

That is, due to the above-described biasing force adjustment mechanism D, a pressure at which the relief valve X starts opening can be set between the first pressure and the third pressure and a fully-open pressure of the relief valve X can be arbitrarily set between the second pressure and the fourth pressure. Accordingly, by changing the set length of the spring 3 according to an operation status of the engine E, an operation efficiency of the pump 6 can be optimized. In addition, by adjusting the pulse number Pn of the motor M, the movement distance L of the retainer 4 can be changed quickly.

Further, according to the embodiment, the pressure is applied to the valve body 2 according to the difference of the areas of the respective pressure-receiving surfaces 21a and 22a. That is, the valve body 2 can be opened by a relatively small differential pressure relative to the fluid pressure, and thus the biasing force of the spring 3 is set small. As a result, the drive force of the motor M changing the set length of the spring 3 can be set small, thereby downsizing the motor M.

On the other hand, in a case where the spring 3 is arranged between the valve body 2 and the retainer 4 and the retainer 4 is moved relative to the valve body 2, air existing in the accommodation space of the spring 3 and/or the working oil entering from the gap between the housing 1 and the valve body 2 serve as a back-pressure resistance, and accordingly the reciprocating motion of the valve body 2 and/or the retainer 4 is inhibited. However, as described above, in the as movable region 19a of the first recessed portion 22b, the through hole portion 22d of the first recessed portion 22b of the valve body 2 is in communication with the relief port 12. Therefore the air and/or the oil which exist in the accommodation space of the spring 3 are always discharged, thereby moving valve body 2 and/or the retainer 4 smoothly. Further, the relief port 12 also includes a function of a back-pressure-escape hole, and thus there is no need to separately provide a back-pressure-escape hole at the housing 1, which enhances reasonability.

In a case where the pressure of the working fluid which is larger than the second pressure is received at the valve body 2 at the lowest pressure setting or in a case where the pressure of the working fluid which is larger than the fourth pressure is received at the valve body 2 at the highest pressure setting, the through hole portion 22d of the first recessed portion 22b might not be in communication with the relief port 12. Accordingly, in the embodiment, the snap ring 20 (an example of a movement prevention portion) restricting the valve body 2 from moving towards the retainer 4 may be provided between the first recessed portion 22b of the valve body 2 and the retainer 4 as illustrated in FIG. 4. Thus, the air and/or the working oil existing in the accommodation space of the spring 3 can be discharged reliably. The snap ring 20 is fitted into a groove formed at the internal hole portion 14 of the housing 1. The movement prevention portion is not specifically limited and may be, for example, a stopper protrudingly formed at the side wall of the housing, as long as the movement prevention portion restricts the valve body 2 from moving towards the retainer 4.

The working oil existing in the accommodation space of the spring 3 may leak out from the gap between the retainer 4 and the housing 1 to a space portion between the retainer 4 and the case 52 of the motor M. However, because the hole portion 41c is firmed at the end portion 41 of the retainer 4, the working oil is returned to the accommodation space of the spring 3 and then is drained from the relief port 12. At the same time, also the air existing in the space portion between the retainer 4 and the case 52 of the motor M is returned to the accommodation space of the spring 3 from the hole portion 41c, and accordingly the reciprocating movement of the retainer 4 is not inhibited.

[Reference Position Setting Mechanism]

At the stepping motor configuring the motor M, a phenomenon of loss of synchronism occurs in which a rotation control or a stop control of the motor M is inhibited, if a load torque applied to the motor M becomes large owning to, for example, a high pressure applied to the valve body 2 even in a case where the motor is provided with a predetermined voltage Vc and is driven. In a case where the phenomenon of loss of synchronism occurs, the current position of the retainer 4 is not grasped. Accordingly, even though the motor M is rotated at the predetermined step angle As the next time, the retainer 4 is not set at a desired position.

The embodiment includes a reference position setting mechanism C setting a reference position of the motor M by bringing the above-described protruding portion 41a of the retainer 4 into contact with the step portion 16 of the housing 1 to cause the loss of synchronism of the motor M. The loss of synchronism of the motor M is conducted in order to reset the position of the retainer 4 periodically so that a mismatch does not occur between a mechanical movement-position of the retainer 4 and an electrical movement-position of the retainer 4 which is recognized by the motor M. Specifically, as illustrated in FIG. 5, at the upper limit position OS, the retainer 4 is made to be in contact with the housing 1, and thus the biasing force of the spring 3 is set at the largest. As a result, the relief pressure is at the highest pressure setting. Consequently, for example, even in a case where the reference position setting mechanism C is performed under the circumstance that the number of rotations of the engine E is high and thus the pressure of the working oil which circulates the working oil to the engine E is required, the discharge pressure of the pump 6 is not decreased.

It is ideal that the reference position setting mechanism C is performed in a case where the viscosity of the working oil decreases at high temperatures and the measured pressure Pd of the pressure sensor P is low. Accordingly, the biasing force of the spring 3 is increased and the relief port 12 is in a closes state, and thus the amount of working oil circulating to the engine E is ensured to reliably prevent engine seizure at the engine E. In addition, the reference position setting mechanism C may be performed at the timing when the engine E is started up and the motor M starts. In this case, a control precision is enhanced because, at the start-up of the engine E, the biasing force adjustment mechanism D can be always performed in a state where a reference position of the motor M is reset regardless of whether or not the motor M had the loss of synchronism before the engine E stopped.

[Control Portion]

Figure 7:
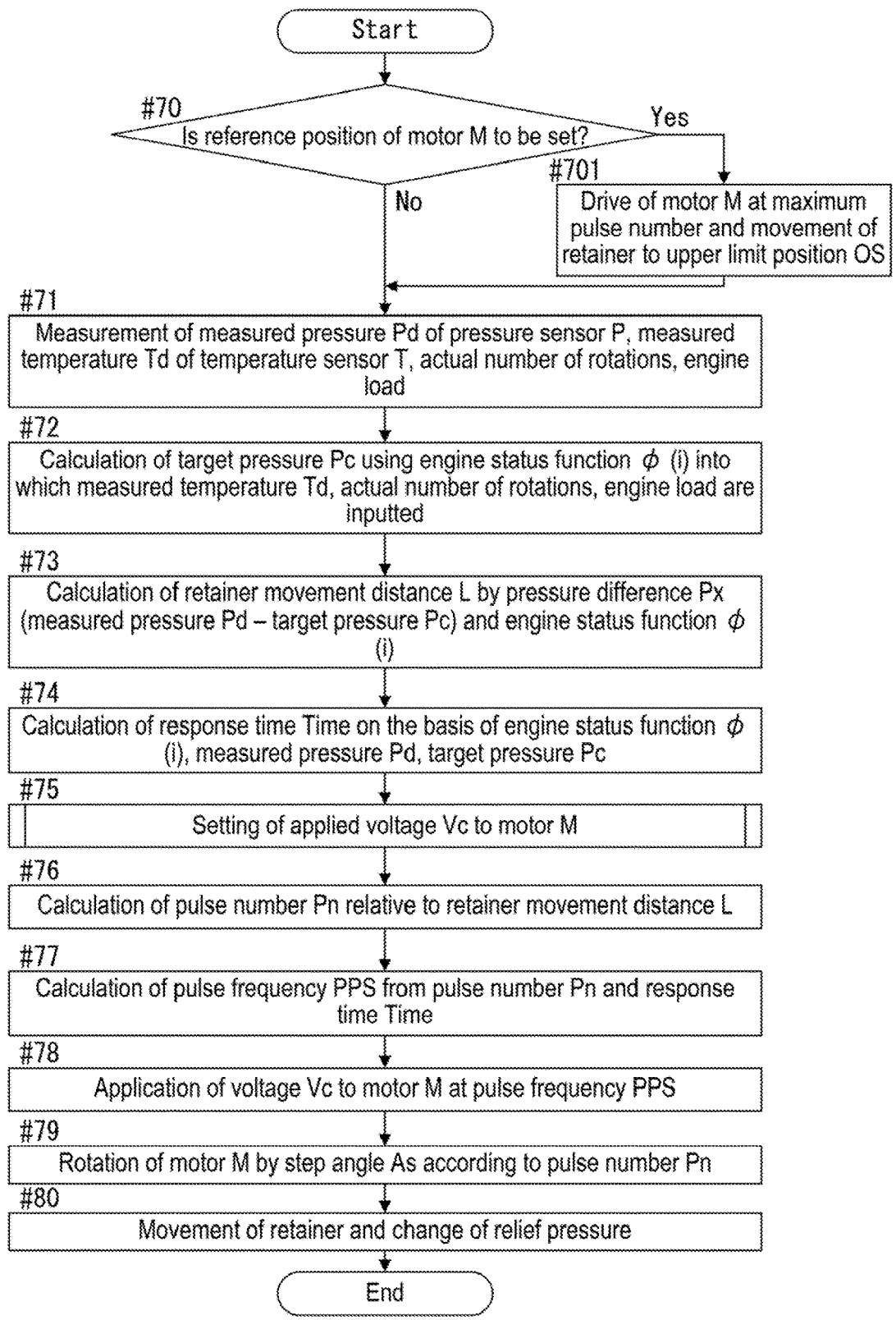
FIG. 7 is a diagram showing an overall control flow.

FIG. 7 illustrates a control flow of the relief valve X. The control portion 9 adjusts the drive force of the motor M and controls the reciprocating movement of the retainer 4. A control method of the relief valve X will be described hereunder with reference to FIGS. 7 to 9.

First, it is determined whether or not the reference position setting mechanism C that sets the reference position of the motor M is to be performed (#70). The reference position setting mechanism C may be performed every time when a predetermined time elapsed from the start-up of the motor M, or the reference position setting mechanism C may be performed when the measured temperature Td of the temperature sensor T is equal to or greater than a predetermined value or the measured pressure Pd of the pressure sensor P is equal to or less than a predetermined value so that the relief port 12 comes to be in the closed state. In a case where the measured temperature Td of the temperature sensor T is equal to or less than the predetermined value and the viscosity of the working oil is high, the motor M easily loses the synchronism, and thus a frequency at which the reference position setting mechanism C is performed may be increased. In case where the reference position setting mechanism C is to be performed, (Yes determination at #70), the motor M is driven at the maximum pulse number that is equal at distance by which the retainer 4 moves from the lower limit position OL to the upper limit position OS (#701). Thus, even in a case where the retainer 4 is in the vicinity of the lower limit position OL, the retainer 4 is moved to the upper limit position OS and the reference position of the motor M is set reliably. On the other hand, in a case where the retainer 4 is between the lower limit position OL and the upper limit position OS, the loss of synchronism of the motor M is performed at the upper limit position OS at which the retainer 4 is in contact with the housing 1, and the reference position of the motor M is set.

Next, the measured pressure Pd of the pressure sensor P, the measured temperature Td of the temperature sensor T, the actual number of rotations of the engine E and/or an engine load based on the opening degree of the throttle are measured (#71). Thereafter, the measured temperature Td of the temperature sensor T, the actual number of rotations of the engine E and/or the engine load are inputted in an engine status function φ (i corresponds to the number of types of input variables) to calculate a target pressure Pc (#72). Here, the engine status function φ (i) is made into a form of a function on the basis of an experimental value and/or an experimental rule. The engine status function φ may be in a form of a map relative to a predetermined input variable. At this time, for example, in a case where the measured temperature Td of the working oil is high and the load of the engine E is large, the target pressure Pc may be multiplied by a correction coefficient so that the relief pressure is on the side of a high pressure setting in order to reliably prevent the engine seizure at the engine E.

Next, the movement distance L of the retainer 4 is calculated from a pressure difference Px (the measured pressure Pd–the target pressure Pc) and the engine status function φ (i) (π73). The movement distance L determines an amount of compression and expansion of the spring 3 such that the measured pressure Pd comes close to the target pressure Pc.

Next, a response time Time corresponding to a moving speed of the retainer 4 is determined on the basis of the engine status function φ (i), the target pressure Pc, the measured pressure Pd (#74). For example, in a case where the pressure difference Px is large and the number of rotations of the engine E is large, the response time Time is sped up or advanced to provide the working oil to the engine E quickly. On the other hand, in a case where the measured temperature Td of the working oil is low and the viscosity is high at, for example, the start-up of the engine E, the load torque on the motor M is, large. Accordingly, the response time Time may be divided into plural portions and be set so that the maximum self-starting frequency at which the motor M can start up appropriately is not exceeded. In this case, a first response time Time 1 is set to be longer than a second response time Time 2 and other response time subsequent to the second response time Time 2, and a pulse frequency PPS that will be described below is set to be relatively high as the motor M is accelerated, and accordingly the motor M is prevented from losing synchronism. Here, the first response time Time 1 corresponds to the first or initial response time, and the second response time Time 2 corresponds to the next response time.

Next, an applied voltage Vc to the motor M is set (#75). The setting of the applied voltage Vc will be described with reference to FIGS. 8 and 9. In the embodiment, in setting the applied voltage Vc applied to the motor M, the measured temperature Td of the temperature sensor T is considered.

Generally, viscosity of working oil includes a negative correlative relationship with temperature of the working oil. The lower the temperature of the working oil is, the higher the viscosity of the working oil is. The higher the temperature of the working oil is, the lower the viscosity of the working oil is. In addition, the higher the viscosity is, the higher the pressure of the working oil increases. The lower the viscosity is, the lower the pressure of the working oil increases. That is, the pressure working on the valve body 2 is in reverse proportion to the temperature of the working oil. Because the pressure working on the valve body 2 corresponds to the load torque to the motor M, wasteful consumption of electricity is restricted by determining the applied voltage Vc to the motor M according to the temperature of the working oil.

Figure 8:
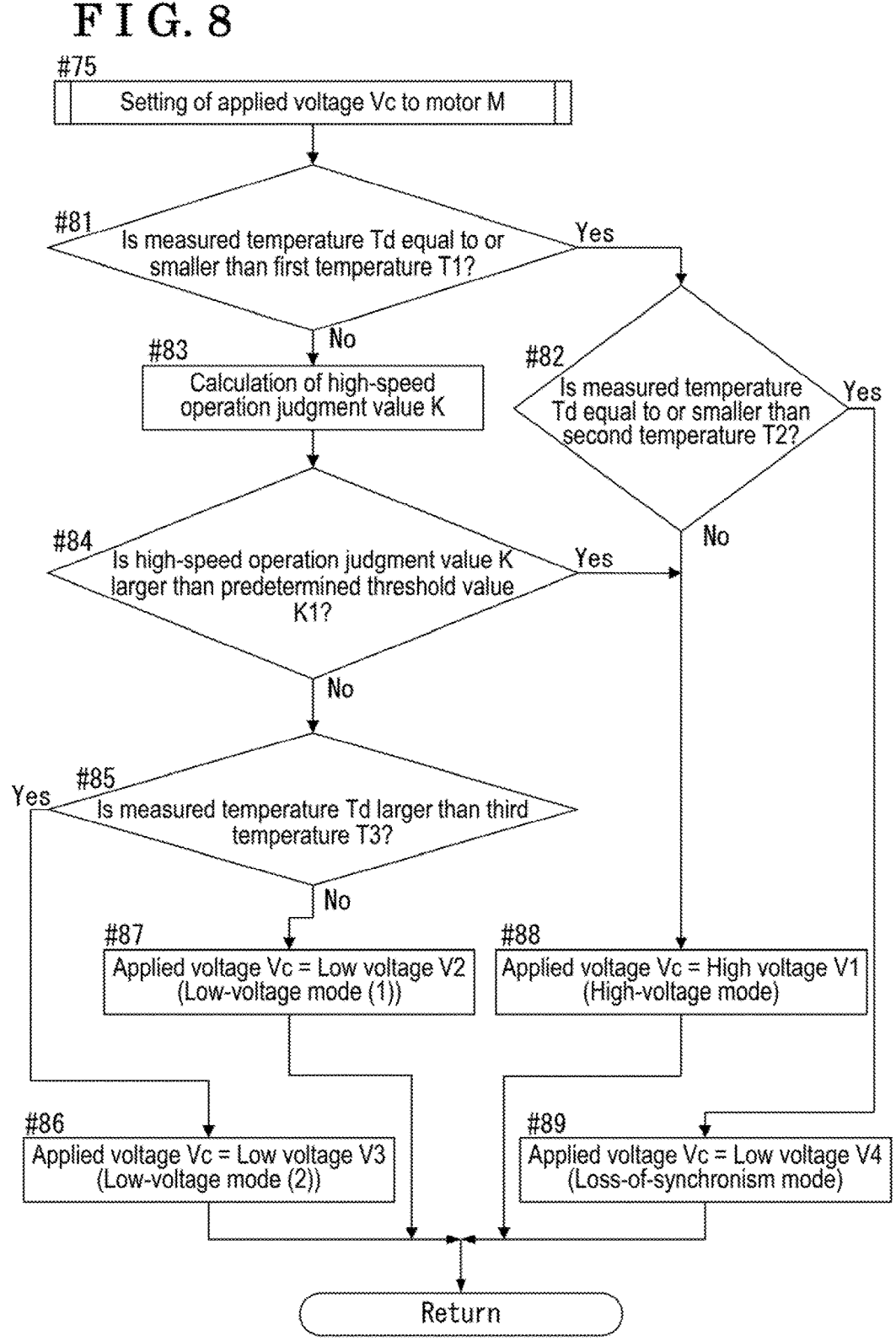
FIG. 8 is a diagram showing a control flow determining an applied voltage to the motor.

As illustrated in FIG. 8, first, it is determined whether or not the measured temperature Td of the temperature sensor T is equal to or less than a first temperature T1 (for example, 20° C.) (#81). In a case where the measured temperature Td as equal to or less than the first temperature T1 (Yes determination at #81), it is determined whether or not the measured temperature Td is equal to or less than a second temperature T2 (around −10° C.) (#82).

It is known that the viscosity of the working oil increases rapidly when the temperature of the working oil becomes lower than, for example, the second temperature T2 (around −10° C.) which is an extremely low temperature in this case, the load torque exceeding a holding torque might be applied to the motor M. Thus, in a case where the measured temperature Td is equal to or smaller than the second temperature T2 (Yes determination at #82), a loss-of-synchronism mode (#89) is set in which the loss of synchronism of the motor M is intentionally performed. That is, the applied voltage Vc to the motor M is set at a third voltage V4 that is close to 0V.

In a case where the measured temperature Td is larger than the second temperature T2 (No determination at #82), a high-voltage mode is set in which the applied voltage Vc to the motor M is a high voltage V1 (a first voltage, for example, 12V) (#88) so as to resist the load torque to the motor M. In this case, even if the motor M is set to the high voltage, the ambient temperature around the motor M is low because the temperature of the working oil is low, and therefore durability of the motor M is not easily deteriorated.

On the other hand, in a case where the measured temperature Td is larger than the first temperature T1 (No determination at #81), a high-speed operation judgment value K is calculated (#83), the high-speed operation judgment value K which serves as a judgment value on whether or not the working oil needs to be supplied to the engine E immediately. The high speed operation judgment value K is converted into a numerical term with the use of, for example, a map, on the basis of the information of load on the engine E including, for example, the opening degree of the throttle. It is defined in a manner that the larger the high-speed operation judgment value K is, the larger a supply amount (pressure) of the working oil to the engine E becomes. A map may be made by combining any one or more of the target pressure Pc, the measured pressure Pd and the response time Time, with the high-speed operation judgment value K.

Next, it is determined whether or not the high-speed operation judgment value K is larger than a predetermined threshold value K1 (#84). In a case where the high-speed operation judgment value K is larger than the predetermined threshold value K1 (Yes determination at #84), the high-voltage mode is set (#88) so that the loss of synchronism does not occur even in a case where the response speed of the motor M is increased.

In a case where the high-speed operation judgment value K is equal to or smaller than the predetermined threshold value K1 (No determination at #84), the mode moves to a low-voltage mode to restrict a driving electric power of the motor M. In consequence, the consumption of electricity to, the motor M can be saved and deterioration of the durability of the motor M which is caused by a continuous operation at the high voltage can be prevented in the embodiment, in order to further save the electricity consumption, the low-voltage mode is divided into two. Thus, it is determined whether or not the measure temperature as larger than a third temperature T3 (for example, 80° C.) (#85).

In a case where the measured temperature Td is equal to or smaller than the third temperature T3 (No determination at #85), a low-voltage mode (1) is set in which the applied voltage Vc to the motor M is a low voltage V2 (an example of a second voltage, for example, 8V) (#87). On the other hand, in a case where the measured temperature Td is larger than the third temperature T3 (Yes determination at #85), a low voltage mode (2) is set in which the applied voltage Vc to the motor M is a low voltage V3 (an example of the second voltage, for example, 5V or smaller than 5V) which is lower than the low voltage V2 (#86). This is because the motor M can be driven with the low voltage V3 which is a small voltage because the viscosity of the working oil decreases considerably and the load torque to the motor M decreases considerably.

Figure 9:
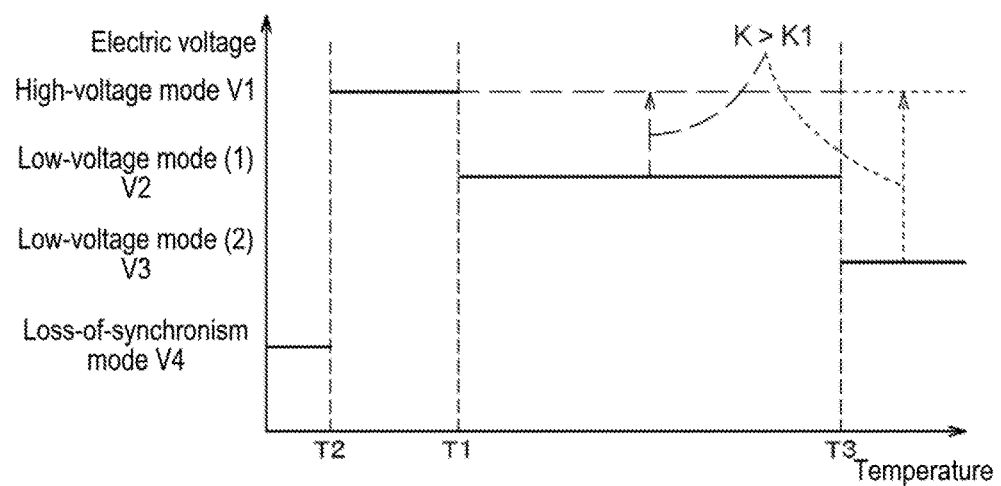
FIG. 9 is a conceptual diagram of the applied voltage to the motor.

In FIG. 9, the set, modes of the applied voltage Vc to the motor M which are in accordance with the measured temperatures Td of the temperature sensor T are schematically shown. As described above, in a case where the measured temperature Td is equal to or smaller than the first temperature T1, the high-voltage mode is set in which the high voltage V1 is applied to the motor M. On the other hand, in a case where the measured temperature Td exceeds the first temperature T1, the low voltage mode is set in which the low voltage V2 or the low voltage V3 which are smaller than the high voltage V1 is applied to the motor M. In a case where the measured temperature Td exceeds the first temperature T1 and the high-speed operation judgment value K is larger than the predetermined value K1, the high voltage mode is set. In a case where the measured temperature Td is equal to or smaller than the second temperature T2 that is smaller than the first temperature T1, the applied voltage to the motor M is lowered to the third voltage. V4 that is smaller than the low voltage V2 and the low voltage V3, and the loss of synchronism of the motor M is intentionally performed. Accordingly, the relief pressure of the relief valve X becomes the lowest pressure setting and the pressure of the working oil circulating to the engine E decreases, thereby facilitating warming-up of the engine E. When the engine E starts, the loss of synchronism of the motor M may be intentionally performed to release the working oil from the relief valve X in order to facilitate the warming-up of the engine E. In addition, without being specifically limited, the divided voltage modes may be further finely divided, and/or the low-voltage mode (1) and the low-voltage mode (2) may be one mode. The applied voltage Vc may be continuously lowered as the measured temperature Td increases.

Next, back to the flow of FIG. 7 after the applied voltage Vc of the motor M is set, the pulse number Pn relative to the movement distance L of the retainer 4 is calculated, the pulse number Pn=Six(L/Li), (Si corresponds to the number of steps per rotation of the motor, Li corresponds to the retainer movement distance per rotation of the motor) (#76). Thereafter, the pulse frequency PPS=Pn/Time is calculated from the pulse number Pn and the response time Time (#77). Thereafter, when the predetermined voltage Vc is applied to the motor M at the pulse frequency PPS (#78), the motor M rotates by the step angle As corresponding to the pulse number Pn (#79). As a result, the position of the retainer 4 changes by the movement distance L and the spring 3 is expanded or compressed, and accordingly the relief pressure is changed (#80). Consequently, the relief pressure at which the operation efficiency of the pump 6 is the highest can be selected in accordance with the state of the engine E. As the control method of the control portion 9, the example where the applied voltage Vc to the motor M is changed according to the measured temperature Td of the temperature sensor T is shown, however, a configuration where an electric current value applied to the motor M is changed according to the measured temperature Td of the temperature sensor T is applicable.

Second to fourth embodiments and, other alternative embodiments will be described hereunder. The basic configurations are similar to the first embodiment described above, and thus only a different configuration will be described with reference to the drawings. The same names of the parts and members and the same reference numerals as the first embodiment are used in the explanation so that the drawings are understood easily.

Second Embodiment

As illustrated in FIG. 12, in the embodiment, a back-pressure hole portion 17 which is in communication with the accommodation space of the spring 3 is penetratingly formed at the side wall of the housing 1, instead of the configuration of the first embodiment in which the through hole portion 22*d* formed at the side wall of the first recessed portion 22*b* of the valve body 2 and the relief port 12 are made in communication with each other.

At the lowest pressure setting of the relief valve X, in a case where the state of FIG. 12 in which the valve body 2 is closed has transitioned to the slate of FIG. 14 in which the valve body 2 is fully opened, the back-pressure hole portion 17 includes a length that is substantially equal to a region between the first recessed portion 22b and the second recessed portion 42. In addition, at the highest pressure setting of the relief valve X, in a case where the state of FIG. 15 in which the valve body 2 is closed has transitioned to the state of FIG. 16 in which the valve body 2 is fully opened, a half of the back-pressure hole portion 17 corresponds to a length that is equal to the region between the first recessed portion 22b and the second recessed portion 42. As described, the back-pressure hole portion 17 is in communication with the accommodation space of the spring 3 (at least the region between the first recessed portion 22b and the second recessed portion 42) when the first recessed portion 22b of the valve body and the second recessed portion 42 of the retainer 4 are the closest to each other. In addition, the movement of the valve body 2 is restricted by the snap ring 20 fixed to the housing 1, and thus the first recessed portion 22b does not block the back-pressure hole portion 17. In the embodiment, the back pressure hole portion 17 is configured to include a shape of an elongated hole, however, any shape may be applied including a circular shape and/or a rectangular shape, for example. In addition, as long as it is configured such that the back pressure of the spring accommodation space is released when the first recessed portion 22b of the valve body 2 and the second recessed portion 42 of the retainer 4 are the closest to each other, the configuration is not specifically limited and the back-pressure hole portion 17 may be divided and plural back-pressure holes portions 17 may be provided.

Figure 10:
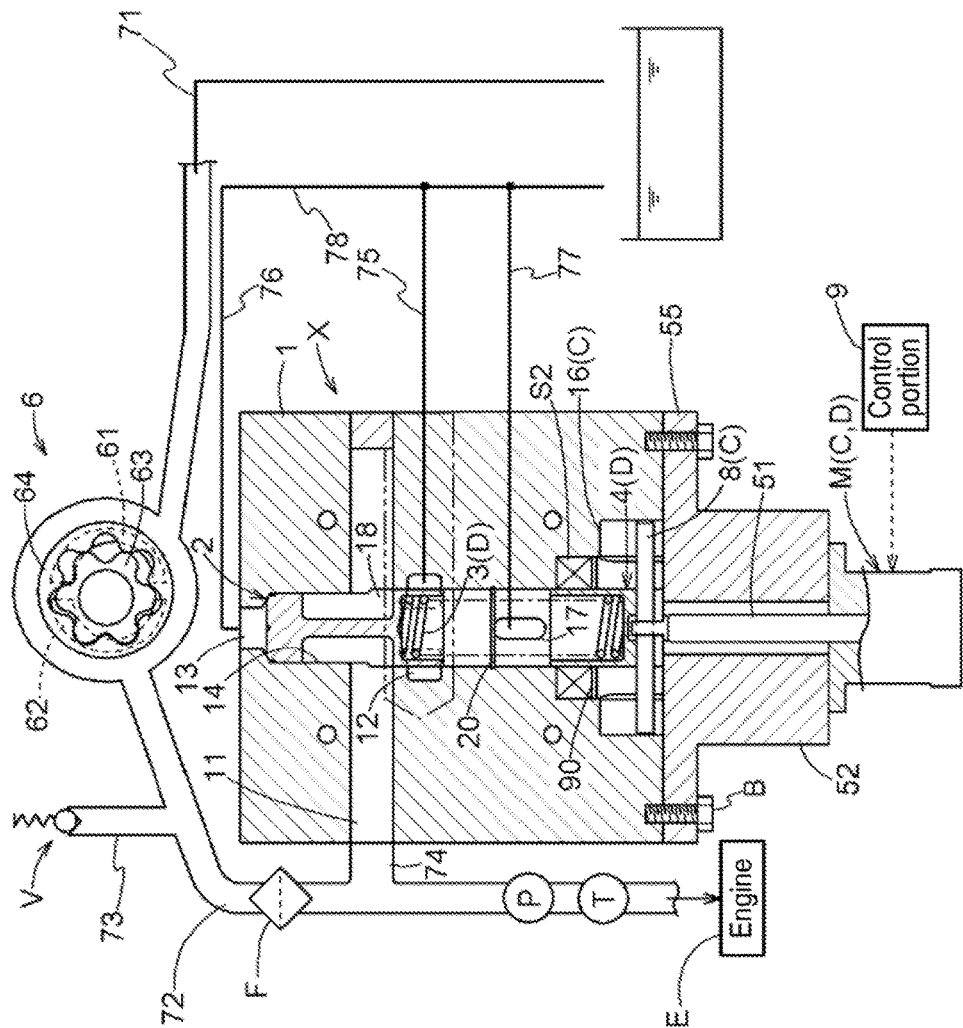
FIG. 10 is a view illustrating a configuration of flow passages related to a second embodiment.
Figure 11:
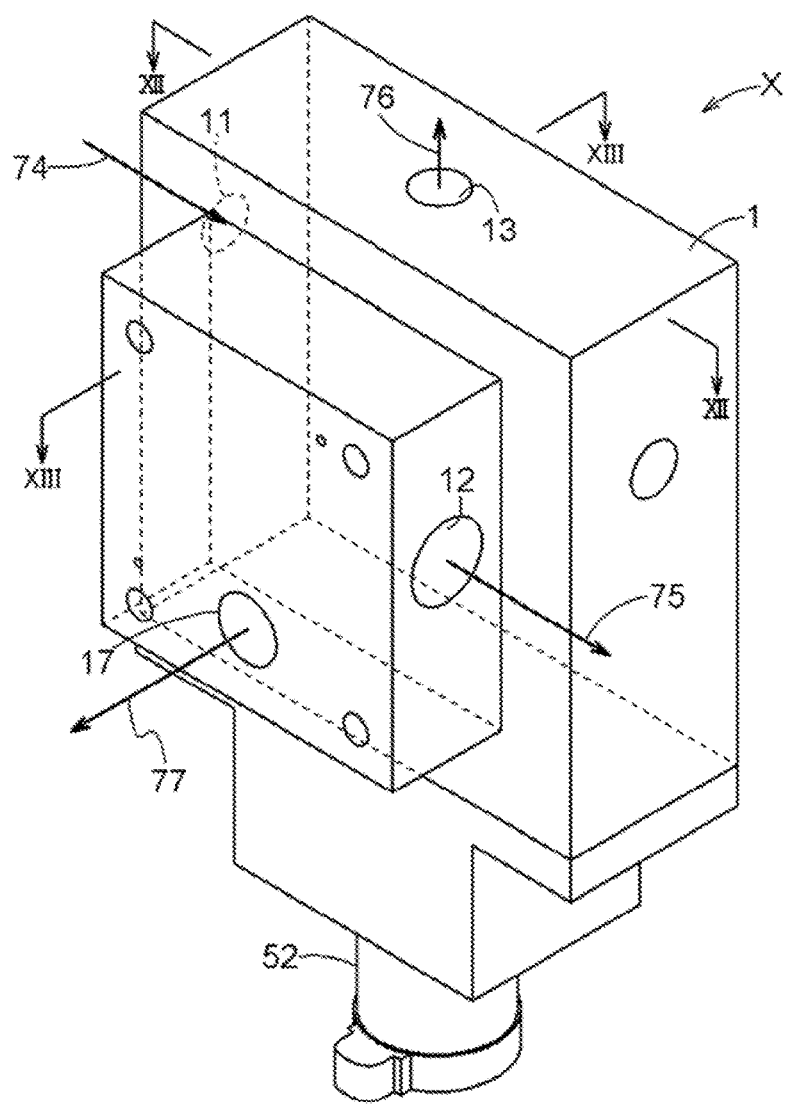
FIG. 11 is a perspective view illustrating a relief valve.

As illustrated in FIGS. 10 and 11, in the embodiment, the back-pressure hole portion 17 releasing the air and/or the working oil, existing in the accommodation space of the spring 3 is connected to a sixth flow passage 77 connected to the drain passage 78. Accordingly, the air and/or the working oil existing in the accommodation space of the spring 3 are discharged to the oil pan 7, and thus the retainer 4 can be reciprocated smoothly. The sixth flow passage 77 may be in communication directly with the oil pan 7 without joining to the drain passage 78, and/or the sixth flow passage 77 may be in communication with the inlet flow passage 71 between the pump 6 and the oil pan 7.

Figure 13:
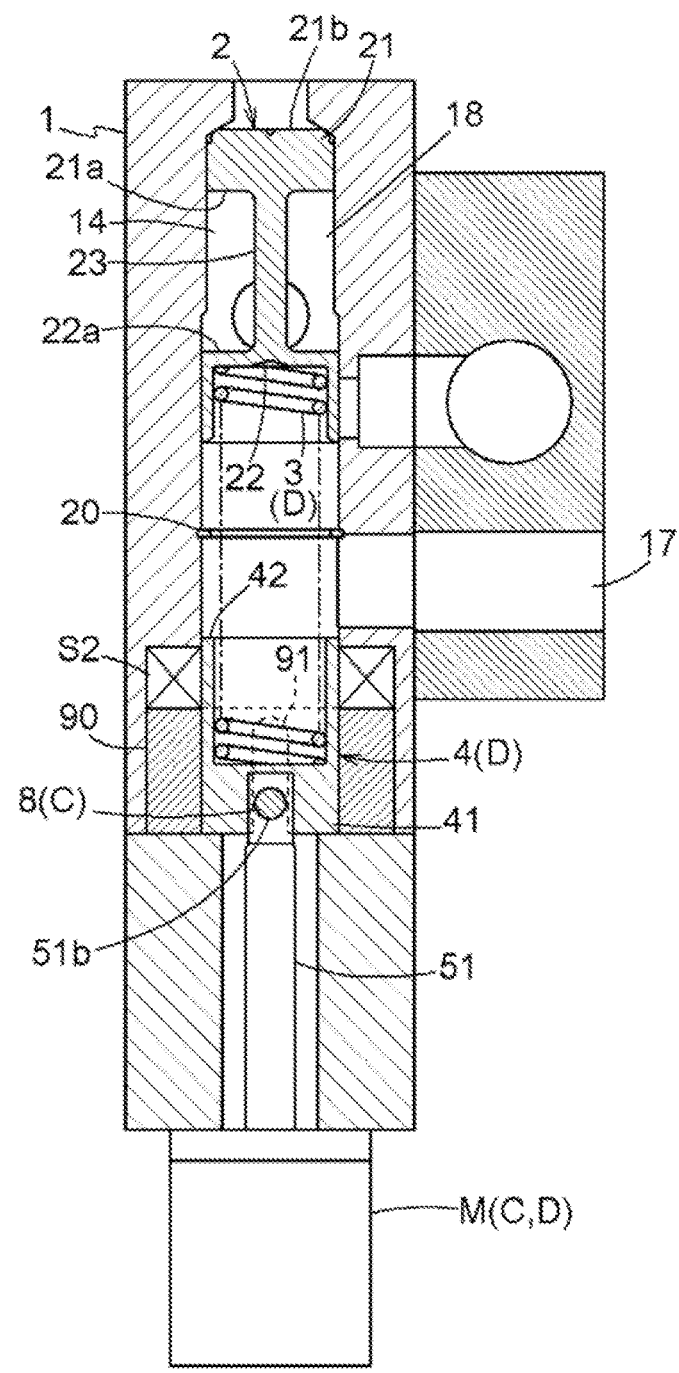
FIG. 13 is a cross-sectional view taken along line XIII-XIII of FIG. 11.

As illustrated in FIGS. 12 and 13, the embodiment includes a stopper pin 8 formed in a shape of a rod and inserted in a hole portion 51b formed at an end portion of the shall 51 of the motor M, instead of the protruding portion 41a formed at the second recessed portion 42 of the retainer 4 of the first embodiment. That is, the reference position setting mechanism C is configured by the step portion 16 of the housing 1, the stopper pin 8 and the motor M.

Figure 15:
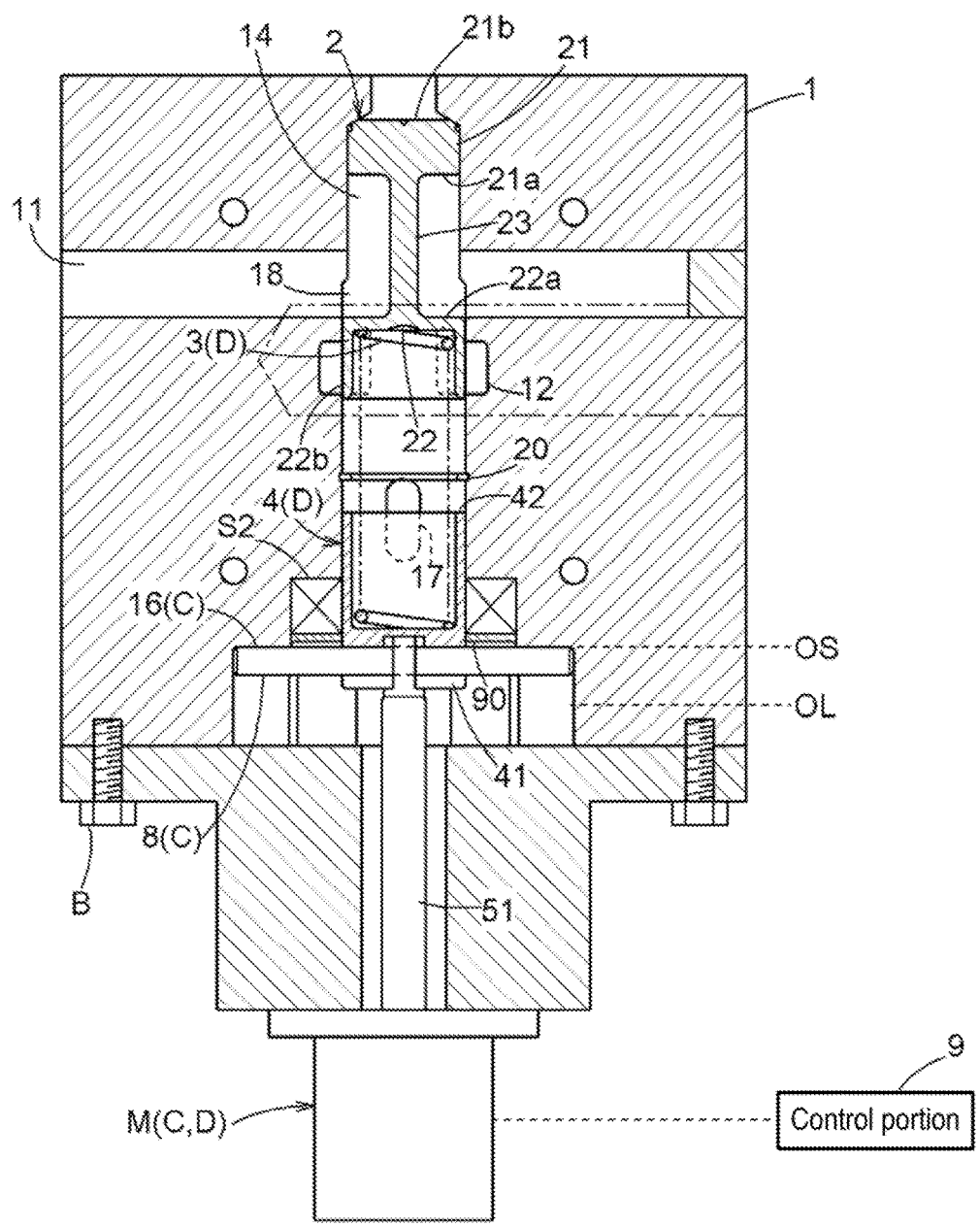
FIG. 15 is a cross-sectional view illustrating a closed state of the relief valve at a highest pressure setting.
Figure 16:
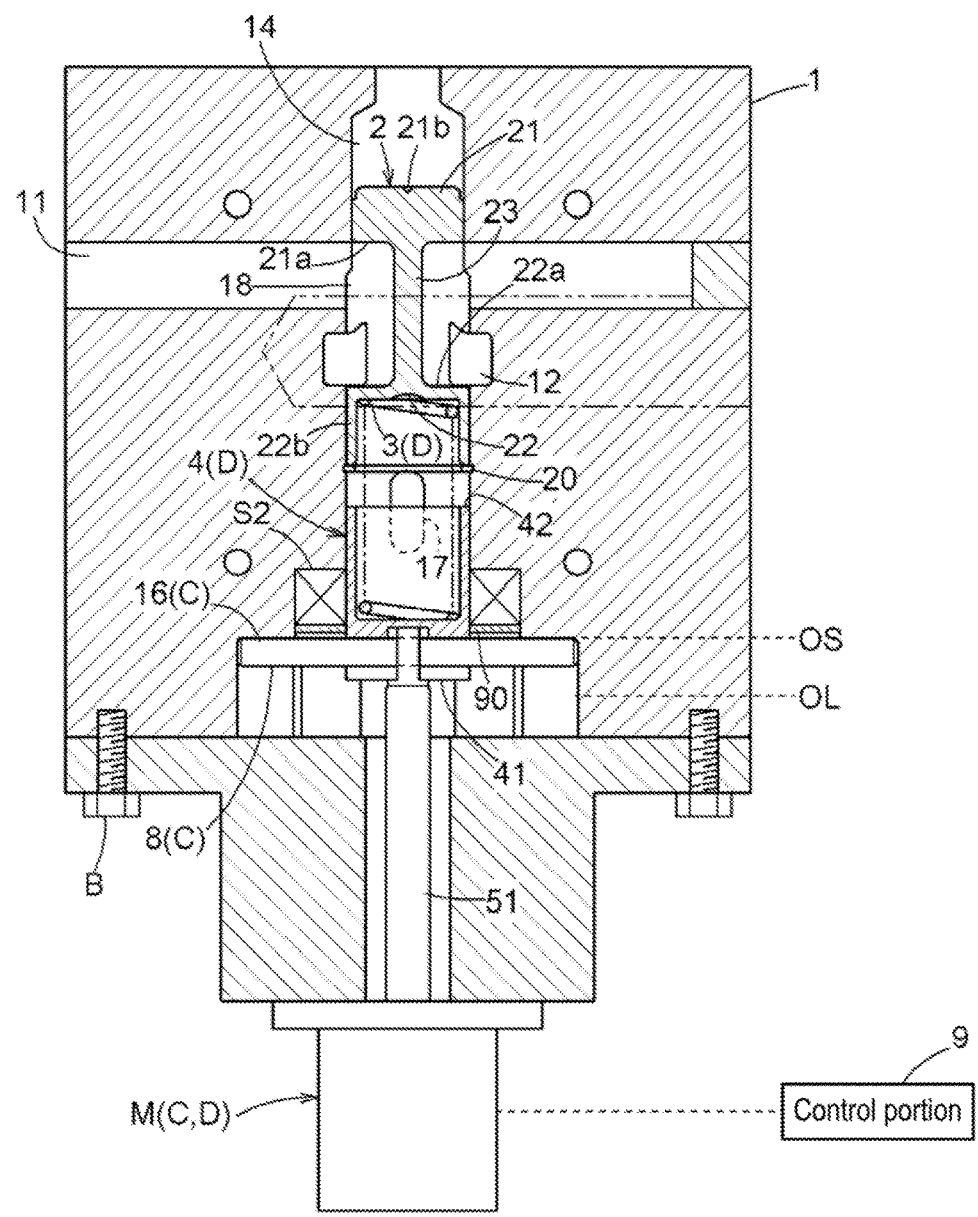
FIG. 16 is a cross-sectional view illustrating a fully-opened state of the relief valve at the highest pressure setting.

As illustrated in FIG. 15, by making the stopper pin 8 be in contact with the step portion 16 of the housing 1, the reference position of the motor M set at the upper limit position OS of the retainer 4. While the shaft 51 is being inserted into the center of the end portion 41 of the retainer 4, the stopper pin 8 is inserted from the radial direction into the hole portion 51b formed at the end portion of the shaft 51, and accordingly the motor M connected to the retainer 4. That is, the stopper pin 8 includes a disengagement prevention function of the shaft 51 and, also includes a function of setting the reference position of the motor M.

As illustrated in FIG. 12, in the embodiment, a seal member S2 including an annular shape is attached between the inner circumferential surface of the housing 1 and an outer circumferential surface of the retainer 4 instead of the seal member S1 including the annular shape and provided at a joining surface at which the housing 1 and the motor M are joined each other in the first embodiment. That is, an inconvenience that the working oil leaks from the gap between the housing 1 and the retainer 4 towards the motor M is prevented by the seal member S2. In consequence, in the embodiment, the hole portion 41c is not formed at the end portion 41 of the retainer 4 as in the first embodiment. A through hole releasing the air existing between the retainer 4 and the motor M may be provided at the side wall of the housing 1 and/or the case 52 of the motor M.

Figure 17:
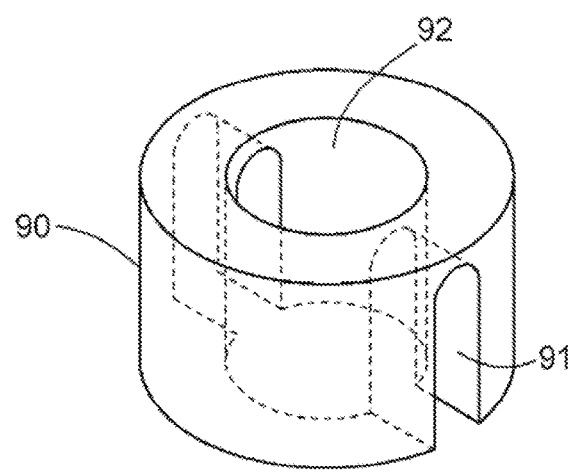
FIG. 17 is a perspective view of a come-off prevention member related to the second embodiment.

In addition, a come-off prevention member 90 formed in a cylindrical shape and preventing the seal member S2 from coming off is arranged between the seal member S2 and the motor M. As illustrated in FIG. 17, the come-off prevention member 90 includes a recessed portion 91 allowing the stopper pin 8 to reciprocate and a retainer accommodation portion 91 allowing the retainer 4 to reciprocate. The smooth movement of the retainer 4 is ensured by the recessed portion 91. The recessed portion 91 is formed at a bottom portion of the come-off prevention member 90 by being cut out in the radial direction. The retainer accommodation portion 92 is formed to penetrate the come-off prevention member 90 in an axial direction. As illustrated in FIG. 14, the recessed portion 91 is formed in a shape such that the stopper pin 8 and a bottom portion of the recessed portion 91 are not in contact with each other when the stopper pin 8 has moved to the upper limit position OS. Accordingly, the seal member 82 is prevented from being damaged duo to the contact of the stopper pin 8 with the come-off prevention member 90.

Third Embodiment

Figure 18:
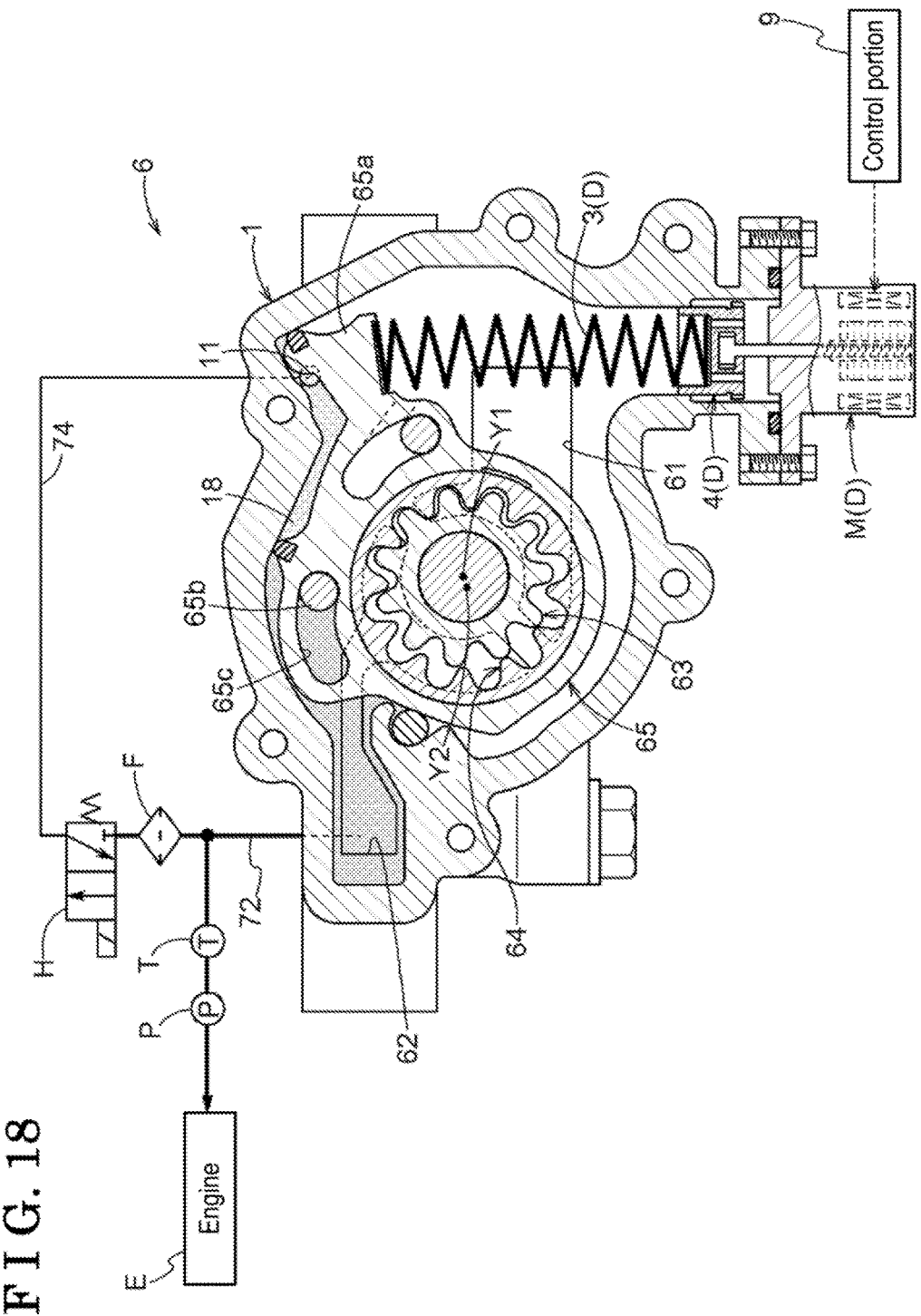
FIG. 18 is a view illustrating pressure adjustment related to a third embodiment.

As illustrated in FIG. 18, in the embodiment, an eccentric amount of the outer rotor 64 relative to the inner rotor 63 is changed by operation of an adjustment member so that the discharge pressure of the pump 6 is adjusted, instead of adjusting the discharge pressure of the pump 6 with the use of the relief valve X as described in the first and second embodiments.

The pump 6 includes the housing 1, the inner rotor 63, the outer rotor 64, an adjustment ring 65 (an example of the adjustment member), an operation portion 65a (an example of the valve body) and the biasing force adjustment mechanism D. A rotational power from the crank shaft of the engine E is transmitted to the inner rotor 63 and the inner rotor 53 rotates about a first rotational axis Y1. The outer rotor 64 rotates about a second rotational axis Y2 that is eccentric relative to the first rotational axis Y1, according to the rotation of the inner rotor 63.

The housing 1 includes the inlet port 61, the discharge port 62 and the internal flow passage 18 in which the working oil discharged from the discharge port 62 flows. The working oil discharged from the discharge port 62 flows to the lubricated members of the engine E via the first flow passage 72 and flows to the internal flow passage 18 via an electromagnetic valve H arranged on the second flow passage 74 branched off from the first flow passage 72. The electromagnetic valve H is configured to be switched between a supply status in which the electromagnetic valve H supplies the working oil to the internal flow passage 18 and a drain status in which the electromagnetic valve H discharges the working oil of the internal flow passage 18. The configuration may not include the electromagnetic valve H.

The adjustment ring 65 supports the outer rotor 64 from the radially outside in such a manner that the outer rotor 64 is relatively rotatable. The adjustment ring 65 is formed in a ring shape that is coaxial with the second rotational axis Y2. The operation portion 65a protruding radially outward direction is connected to the adjustment ring 65. When the electromagnetic valve H is in the supply status and the pressure of the working oil flowing through the internal flow passage 18 is applied to the operation portion 65a of the adjustment ring 65, the operation portion 65a reciprocates inside the housing 1, and accordingly the adjustment ring 65 revolves about the second rotational axis Y2. As a result, a guide pin 65b and a guide groove 65c slidably move with each other over a predetermined range, and the first rotational axis V1 and the second rotational, axis Y2 come close to each other, thereby decreasing the discharge pressure of the pump 6. That is, it is configured such that, as the adjustment ring 65 revolves, the eccentric amount of the outer rotor 64 relative to the inner rotor 63 is adjusted, and the discharge pressure of the pump 6 is adjusted.

The biasing force adjustment mechanism D is connected to the adjustment, ring 65. The biasing force adjustment mechanism D is configured by the spring 3, the retainer 4 and the motor M. The biasing force adjustment mechanism 1) and the other configurations include similar functions and effects to the above-described first and second embodiments, and therefore detailed explanations will be omitted.

Fourth Embodiment

Figure 19:
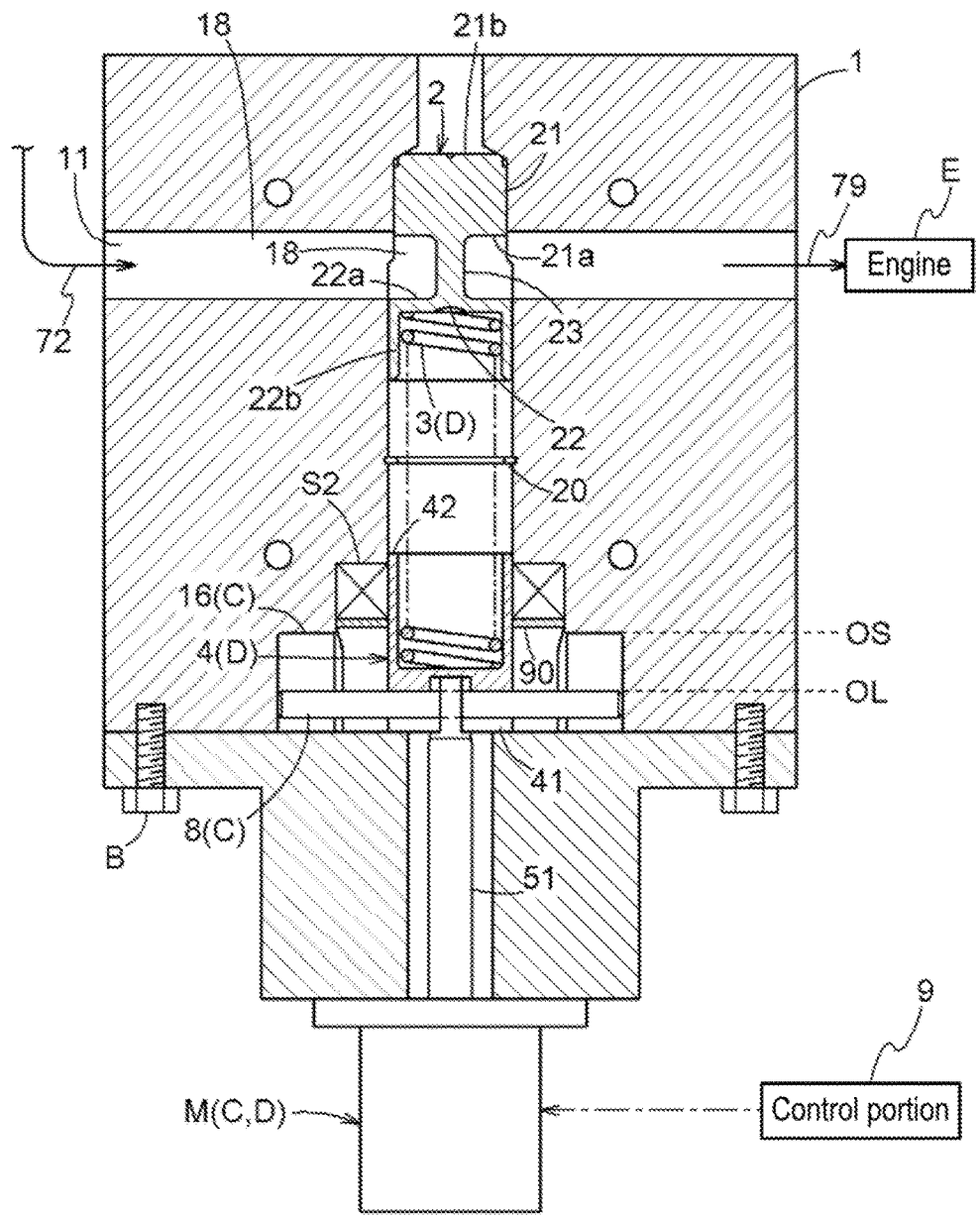
FIG. 19 is a view illustrating pressure adjustment related to a fourth embodiment.

As illustrated in FIG. 19, a flow amount control valve changing a flow area of the internal flow passage 18 of the housing 1 may be applied instead of the relief valve X of the first and second embodiments. In the present embodiment, as the first pressure-receiving portion 21 of the valve body 2 protrudes to the internal flow passage 18 and retracts or withdraws from the internal flow passage 18, the flow area is changed and thus the pressure of the working oil which has flowed from the first flow passage 72 into the internal flow passage 18 is adjusted. The working oil of which the pressure has been adjusted is supplied to the engine E via a seventh flow passage 79. Also in the embodiment, effects and operations that are similar to the above-described first and second embodiments are expected.

First Alternative Embodiment

Figure 20:
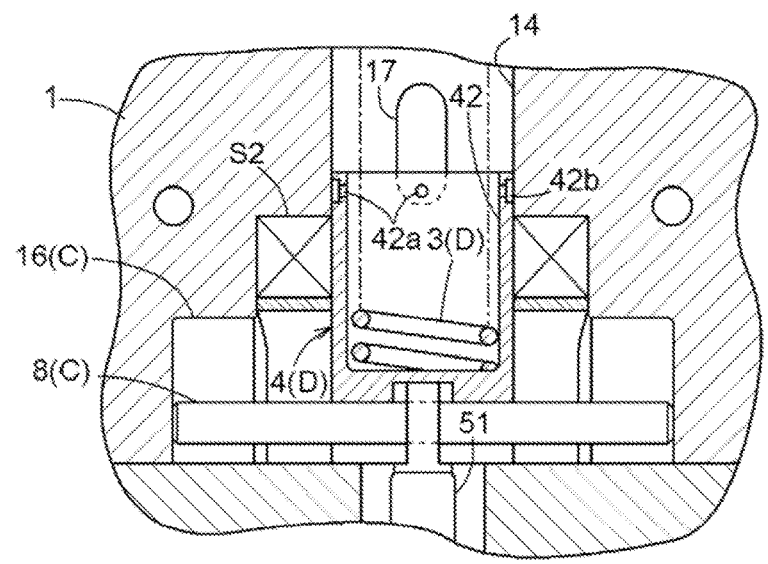
FIG. 20 is a cross-sectional view of a back-pressure-escape mechanism, which shows a first alternative embodiment.

As illustrated in FIG. 20, as a back-pressure-escape mechanism of the accommodation space of the spring 3, a through hole portion 42a may be formed at a side wall of the second recessed portion 42 of the retainer 4 in such a manner that the through hole portion 42a is in communication with the back-pressure hole portion 1 formed at the side wall of the housing 1. The back-pressure hole portion 17 of the housing 1 is formed to be in communication with the through hole portion 42a in the movable region 19a of the second recessed portion 42 (in particular, when the retainer 4 moves to the position shown in FIG. 15), the movable region 19a which is from the lower limit position OL of the retainer 4 at which the lowest pressure setting of the relief valve X is set to the upper limit position OS of the retainer 4 at which, the highest pressure setting of the relief valve X is set. Thus, the back-pressure hole portion 17 serves as the breathing hole in a case where the valve body 2 and/or the retainer 4 move in the reciprocating manner. In this case, the working oil that has lowered to the retainer 4 can be discharged quickly compared to a case where the back-pressure hole portion 17 is provided at an upper portion of the housing 1 or in the vicinity of the center of the housing 1.

As illustrated in FIG. 20, an annular groove 42b may be formed at an outer circumferential surface of the retainer 4. Instead of the annular groove 42b, an annular groove may be formed at the internal hole 14 of the housing 1 in a manner that the annular groove is in communication with the through hole portion 42a of the second recessed portion 42. An opening area of the back-pressure hole portion 17 of the housing 1 may be increased so as to be in communication with the through hole portion 42a of the second recessed portion 42. The configuration is not specifically limited.

Second Alternative Embodiment

Figure 21:
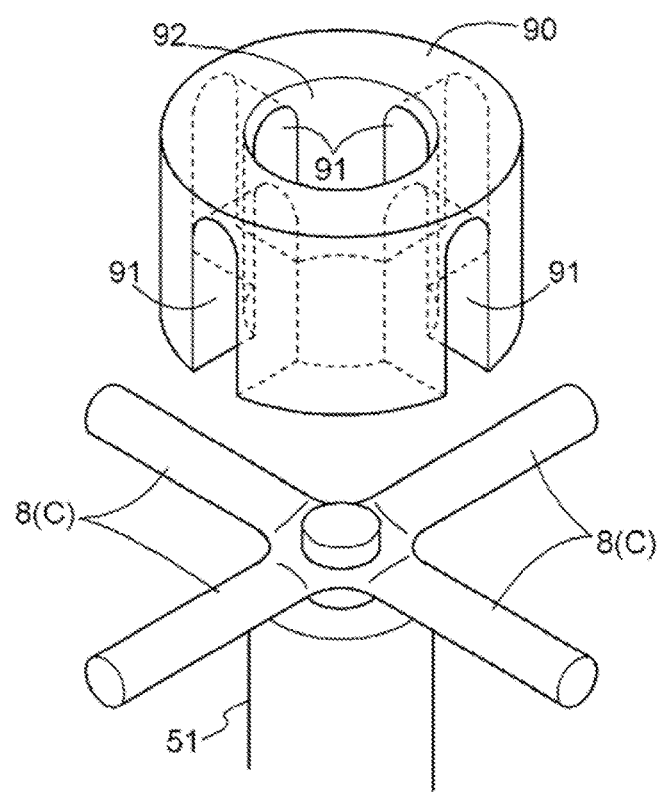
FIG. 21 is a cross-sectional view of a stopper pin, which shows a second alternative embodiment.

As illustrated in FIG. 21, the stopper pin 8 may be formed in a cross shape and the bottom portion of the come-off prevention member 90 may be formed in a cross shape in a cut-out manner. In this case, the stopper pin 8 is extended in a balanced manner in a circumferential direction, and thus a posture of the stopper pin 8 during the movement can be stabilized.

Third Alternative Embodiment

As illustrated in FIG. 22, it may be configured such that the come-off prevention member 90 is in contact with the housing 1 between the seal member S2 and the motor M, and the stopper pin 8 is in contact with a bottom surface of the recessed portion 91 of the come-off prevention member 90, and accordingly the upper limit position OS of the retainer 4 is set. In this case, even in a case where the stopper pin 8 is in contact with the come-off prevention member 90, the come-off prevention member 90 is in contact with the housing 1 and thus is inhibited from moving, and accordingly an inconvenience that the seal member S2 is pressed and pushed strongly does not occur. Consequently, the seal member S2 is reliably prevented from being damaged.

Other Embodiment (1) The configurations of the respective embodiments described above may be combined with each other appropriately. For example, the protruding portion 41a of the retainer 4 related to the first embodiment may include the pin-shape as in the second embodiment and/or the second alternative embodiment. The relief valve X of the first embodiment may include the annular-shaped seal member S2 arranged between the inner circumferential surface of the housing 1 and the outer circumferential surface of the retainer 4 and may include the come-off prevention member 90 formed in the cylindrical shape and preventing the seal member S2 from coming off, as in the second embodiment.

(2) The input variable to the engine status function φ (i) may be configured at least by the temperature of the working oil and the number of rotations of the engine E, and the information of load on the engine E may be omitted, for example. Also in this case, by setting the applied voltage Vc to the motor M according to the viscosity of the working oil, the consumption of electricity can be saved. In addition, by adjusting the biasing force of the spring 3 according to the number of rotations of the engine E, the operation efficiency of the pump 6 can be enhanced.

(3) The flow passages for the supply to the lubricated members of the engine E of the above-described first and second embodiments may be connected to the seventh flow passage 79 via the internal flow passage 18 of the housing 1 as in the fourth embodiment.

(4) The motor M of the above-described embodiments is not limited to the stepping motor and may be configured by, for example, a servomotor which can adjust a rotational angle by a feedback control.

(5) In the above-described embodiments, the trochoid pump is shown as an example of the pump 6, however, the pump 6 may be any form of pump, including a vane pump, for example.

(6) The relief valve X of the above-described embodiments is not specifically limited and may be a relief valve adjusting a discharge pressure of a water pump circulating a coolant medium to the engine E.

(7) The shapes and configurations of the component parts of the above-described embodiments may be appropriately changed as long as functions thereof are ensured.

INDUSTRIAL APPLICABILITY

This invention is applicable to a relief valve adjusting a discharge pressure of an actuating pump of various types including, for example, an oil pump circulating a working oil to lubricated members of an engine.

EXPLANATION OF REFERENCE NUMERALS

1 housing
9 control portion
12 relief port
17 back-pressure hole portion
18 internal flow passage
19a movable range (movable region of second recessed portion)
2 valve body
20 snap ring (movement prevention portion)
21 first pressure-receiving portion
22 second pressure-receiving portion
22a second pressure-receiving surface (pressure-receiving surface)
22b first recessed portion
22d through hole portion
3 spring
4 retainer (support portion)
42 second recessed portion
42a through hole portion
C reference position setting mechanism
D biasing force adjustment mechanism
M motor (stepping motor)
P pressure sensor
Pc target pressure
Pd measured pressure
L movement distance
T temperature sensor
T1 first temperature
Td measured temperature
Time response time
V1 high voltage (first voltage)
V2, V3 low voltage (second voltage)
X relief valve

The invention claimed is:

1. A relief valve comprising:
a housing including:
an internal flow passage through which a working fluid flows, and
a relief port discharging the working fluid from the internal flow passage;
a valve body including:
a first pressure-receiving portion receiving pressure of the working fluid flowing in the internal flow passage,
a second pressure-receiving portion connected to the first pressure-receiving portion to oppose the first pressure-receiving portion and receiving the pressure with a pressure-receiving area that is larger than a pressure-receiving area of the first pressure-receiving portion, and
a first recessed portion formed at the second pressure-receiving portion at an opposite side relative to a pressure-receiving surface of the second pressure-receiving portion and including a closed-end cylindrical shape;
the valve body being capable of reciprocating inside the housing; and
a biasing force adjustment mechanism including:
a spring of which one end is held at the first recessed portion and biasing in a direction opposing the pressure,
a support portion formed with a second recessed portion retaining the other end of the spring and including a closed-end cylindrical shape, and
a motor adjusting a rotational angle and causing the support portion to reciprocate, wherein
a through hole portion is formed at a side wall of the second recessed portion, and
a back-pressure hole portion which is in communication with the through hole portion of the second recessed portion in a movable region of the second recessed portion is formed at a side wall of the housing in a penetrating manner.

2. The relief valve according to claim 1, wherein the motor corresponds to a stepping motor.

3. The relief valve according to claim 2, comprising:
a reference position setting mechanism causing the support portion to be in contact with a predetermined portion of the housing to cause the stepping motor to lose synchronism and setting a reference position of the stepping motor at an operation of the stepping motor.

4. The relief valve according to claim 1, comprising:
a pressure sensor measuring pressure of the working fluid; and
a control portion adjusting a drive force of the motor, wherein the control portion determines a movement distance of the support portion and a response time of the motor on the basis of a target pressure and a measured pressure measured at the pressure sensor.

5. The relief valve according to claim 1, comprising:
a temperature sensor measuring temperature of the working fluid; and
a control portion adjusting a drive force of the motor, wherein
in a case where a measured temperature measured at the temperature sensor is equal to or smaller than a first temperature, the control portion sets a high-voltage mode in which a first voltage is applied to the motor and
in a case where the measured temperature exceeds the first temperature, the control portion sets a low-voltage mode in which a second voltage which is smaller than the first voltage is applied to the motor.

6. A relief valve comprising:
a housing including:
- an internal flow passage through which a working fluid flows, and
- a relief port discharging the working fluid from the internal flow passage;

a valve body including:
- a first pressure-receiving portion receiving pressure of the working fluid flowing in the internal flow passage,
- a second pressure-receiving portion connected to the first pressure-receiving portion to oppose the first pressure-receiving portion and receiving the pressure with a pressure-receiving area that is larger than a pressure-receiving area of the first pressure-receiving portion, and
- a first recessed portion formed at the second pressure-receiving portion at an opposite side relative to a pressure-receiving surface of the second pressure-receiving portion and including a closed-end cylindrical shape;

the valve body being capable of reciprocating inside the housing;

a biasing force adjustment mechanism including:
- a spring of which one end is held at the first recessed portion and biasing in a direction opposing the pressure,
- a support portion formed with a second recessed portion retaining the other end of the spring and including a closed-end cylindrical shape, and
- a motor adjusting a rotational angle and causing the support portion to reciprocate; and a movement prevention portion provided between the valve body and the support portion and restricting the valve body from moving towards the support portion.

7. The relief valve according to claim 6, wherein a through hole portion is formed at a side wall of the first recessed portion, the through hole portion is in communication with the relief port in a movable region of the first recessed portion.

8. The relief valve according to claim 6, wherein
a back-pressure hole portion which is in communication with an accommodation space of the spring is formed at a side wall of the housing in a penetrating manner, and
the back-pressure hole portion is in communication with the accommodation space when the first recessed portion and the second recessed portion are closest to each other.

9. The relief valve according to claim 6, wherein the motor corresponds to a stepping motor.

10. The relief valve according to claim 9, comprising:
a reference position setting mechanism causing the support portion to be in contact with a predetermined portion of the housing to cause the stepping motor to lose synchronism and setting a reference position of the stepping motor at an operation of the stepping motor.

11. The relief valve according to claim 6, comprising:
a pressure sensor measuring pressure of the working fluid; and
a control portion adjusting a drive force of the motor, wherein the control portion determines a movement distance of the support portion and a response time of the motor on the basis of a target pressure and a measured pressure measured at the pressure sensor.

12. The relief valve according to claim 6, comprising:
a temperature sensor measuring temperature of the working fluid; and
a control portion adjusting a drive force of the motor, wherein
in a case where a measured temperature measured at the temperature sensor is equal to or smaller than a first temperature, the control portion sets a high-voltage mode in which a first voltage is applied to the motor and
in a case where the measured temperature exceeds the first temperature, the control portion sets a low-voltage mode in which a second voltage which is smaller than the first voltage is applied to the motor.

* * * * *